United States Patent
Hanson et al.

(10) Patent No.: US 9,262,759 B2
(45) Date of Patent: Feb. 16, 2016

(54) WEARABLE DEVICE AS A PAYMENT VEHICLE

(71) Applicant: Bank of America Corporation, Charlotte, NC (US)

(72) Inventors: Carrie Anne Hanson, Charlotte, NC (US); David M. Grigg, Rock Hill, SC (US); Richard Andrew Starbuck, Walnut Creek, CA (US); Alicia C. Jones, Fort Mill, SC (US); Audrey L. Longfellow, Oak Hill, VA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 15 days.

(21) Appl. No.: 14/249,757

(22) Filed: Apr. 10, 2014

(65) Prior Publication Data
US 2015/0294303 A1    Oct. 15, 2015

(51) Int. Cl.
*G07F 19/00* (2006.01)
*G06Q 20/34* (2012.01)
*G06K 19/07* (2006.01)
*G06K 19/06* (2006.01)

(52) U.S. Cl.
CPC ........ *G06Q 20/347* (2013.01); *G06K 19/06046* (2013.01); *G06K 19/06187* (2013.01); *G06K 19/0723* (2013.01)

(58) Field of Classification Search
CPC ... G07F 19/20; G07F 7/1008; G06G 20/1085; G06Q 30/02; G06Q 20/341
USPC .......................................... 235/379, 375, 382
See application file for complete search history.

(56) References Cited

U.S. PATENT DOCUMENTS

| | | | |
|---|---|---|---|
| 2,014,006 A | | 9/1935 | Morrison |
| 4,598,275 A | * | 7/1986 | Ross et al. ................. 340/573.4 |
| 4,783,917 A | * | 11/1988 | Smith et al. ...................... 40/633 |
| 6,142,368 A | * | 11/2000 | Mullins et al. ................ 235/375 |
| 7,349,557 B2 | | 3/2008 | Tibor |
| 7,398,253 B1 | | 7/2008 | Pinnell |
| 7,606,770 B2 | | 10/2009 | Pinnell |
| 7,716,129 B1 | | 5/2010 | Tan et al. |
| 8,485,422 B2 | | 7/2013 | Rometty et al. |
| 8,490,865 B2 | | 7/2013 | Randazza et al. |
| 2012/0203700 A1 | | 8/2012 | Ornce et al. |
| 2013/0110658 A1 | | 5/2013 | Lyman et al. |
| 2013/0212024 A1 | | 8/2013 | Mattsson et al. |
| 2013/0246203 A1 | | 9/2013 | Laracey |
| 2013/0246258 A1 | | 9/2013 | Dessert |
| 2013/0246260 A1 | | 9/2013 | Barten et al. |
| 2014/0006190 A1 | | 1/2014 | Loomis, III et al. |

* cited by examiner

*Primary Examiner* — Karl D Frech
(74) *Attorney, Agent, or Firm* — Michael Springs; Moore & Van Allen PLLC; Anup Shrinivasan

(57) ABSTRACT

The present invention is directed to apparatuses, methods, and computer-program products for a multipurpose wearable device that is associated with one or more financial accounts wherein, in use, the wearable device is configured to facilitate a financial transaction using at least one of the one or more financial accounts. The wearable device comprises: a wearable article, wherein the wearable article comprises one or more features securing the wearable article to a person or an item associated with the person; and a portion comprising a machine-readable indicia, wherein the machine-readable indicia, when successfully read, provides payment information for conducting a financial transaction.

20 Claims, 19 Drawing Sheets

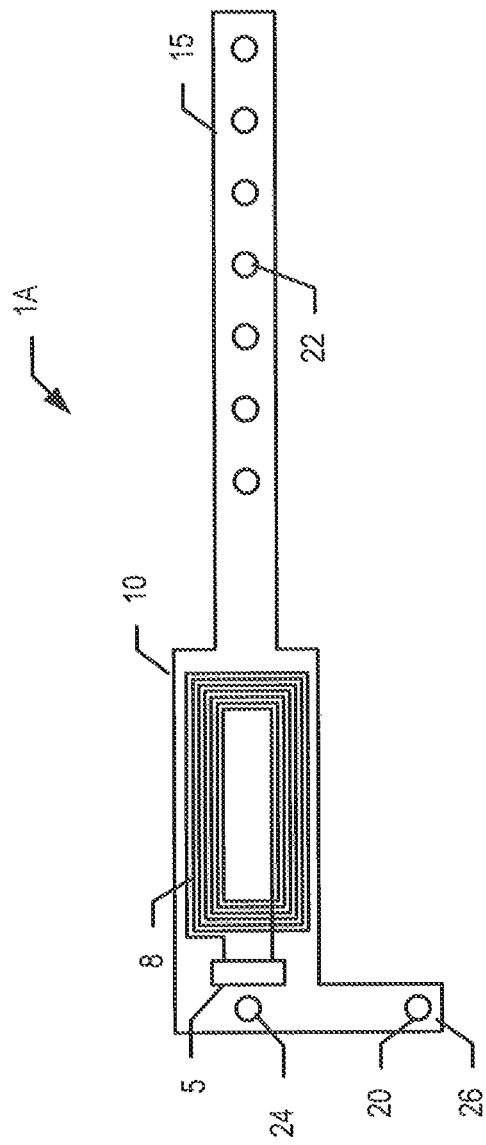
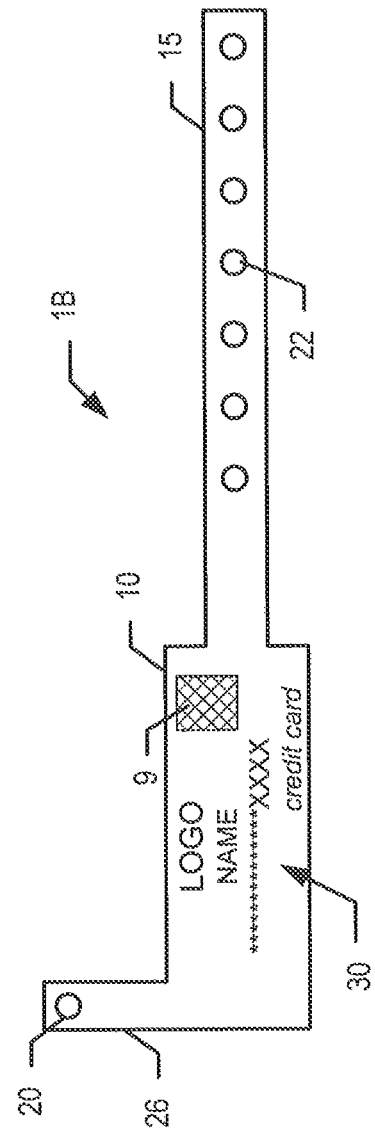
FIG. 1A
FIG. 1B

RED JEWEL = TODAY'S SPENDING ABOVE THRESHOLD
YELLOW JEWEL = TODAY'S SPENDING NEAR THRESHOLD
GREEN JEWEL = TODAY'S SPENDING WELL BELOW THRESHOLD

BLUE CLOCK FACE = ACCOUNT BALANCE ABOVE THRESHOLD
WHITE CLOCK FACE = ACCOUNT BALANCE BELOW THRESHOLD

VIBRATES WHEN TRANSACTION OCCURS INVOLVING THE ACCOUNT

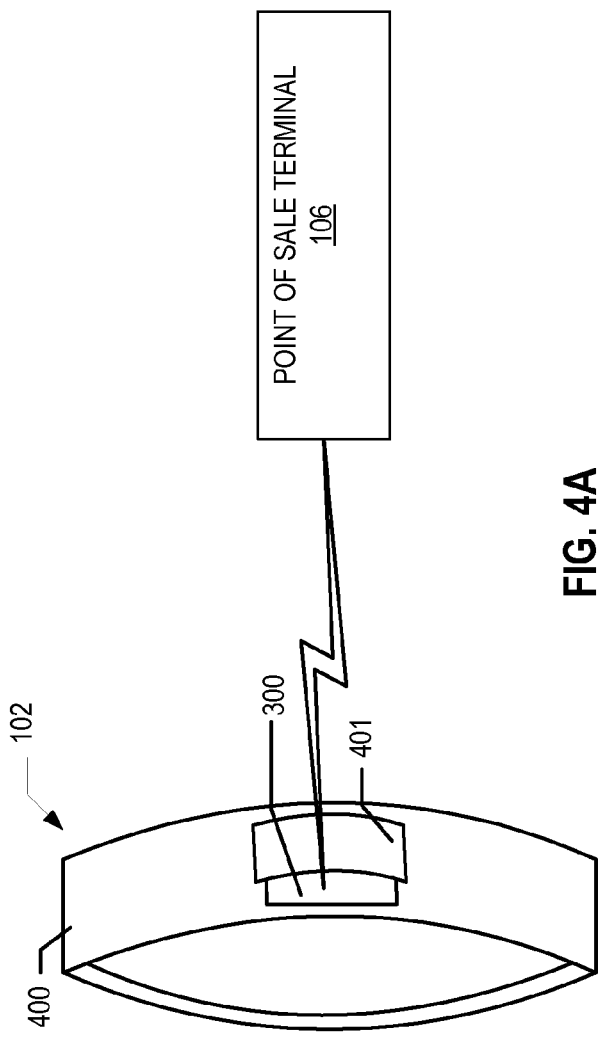
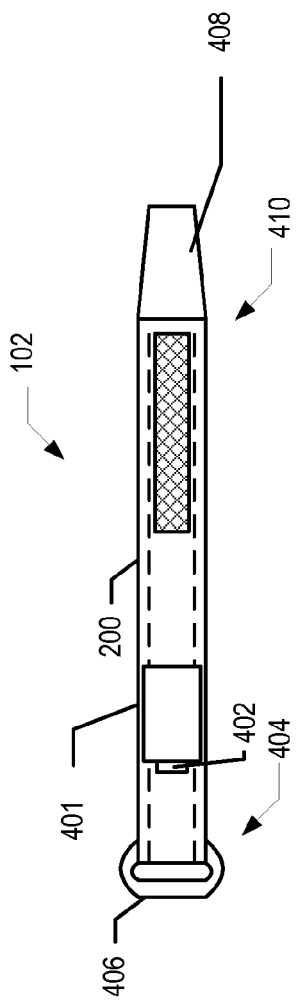
FIG. 4A
FIG. 4B

WEARABLE DEVICE AS A PAYMENT VEHICLE

BACKGROUND

When traveling, a user often requires the ability to make purchases and therefore typically carries a wallet and/or a smart phone to do so. However, if the user is traveling to a beach, a resort, a waterpark, a theme park, or the like (e.g., a location with potential hazards to electronic devices), the user may expose their wallet and/or smart phone to hazardous conditions. Furthermore, the user may be responsible for funding the activities of multiple users (e.g., a family, a business team, a school class, or the like). Thus, there is a need for a wearable device configured to support multiple users that can be utilized as a payment vehicle and that is resistant to conditions that are potentially hazardous to the users' personal electronic devices.

BRIEF SUMMARY

The present invention is directed to a system for facilitating a financial transaction utilizing a wearable device as a payment vehicle. The wearable device (e.g., a bracelet, a ring, a watch, glasses, or the like) includes readable indicia (e.g., a quick response (QR) code, a scannable bar code, or the like) that are configured to be read by a mobile communication device (e.g., a smart phone, a computing device, a point of sale (POS) terminal, or the like). A user is enabled, via an application associated with the mobile communication device, to assign one or more financial payment accounts to the readable indicia so that the user may use the wearable device as payment in lieu of a credit card, debit card, or the like. The user may further configure limits (e.g., spending limits, purchase amount limits, limits on purchase type or category, or the like) of various types for each account, wearable device, and readable indicia. The system also tracks spending behavior for user review and analysis.

In some embodiments, a system is configured to facilitate a financial transaction using a wearable device as a payment vehicle. The system comprises the wearable device, which comprises a wearable article, wherein the wearable article comprises one or more features securing the wearable article to a person or an item associated with the person, and a portion comprising at least one machine-readable indicia, wherein the at least one machine-readable indicia, when successfully read, provides payment information for facilitating the financial transaction. The system also comprises a mobile communication device that comprises a memory, a processor, and a module stored in memory, executable by the processor. The mobile communication device is configured to read the at least one readable indicia associated with the wearable device, receive a first user input that assigns the at least one readable indicia to a financial payment account, and receive a second user input that assigns at least one limit to the at least one readable indicia.

In some embodiments, the wearable article is at least one of a bracelet, a ring, a watch, a wristband, an ankle band, a hairband, a headband, a necklace, jewelry, eye glasses, a monocle, a pen, a hairband, a bracelet charm, a magnetic strip, a stylus, or a tag.

In some embodiments, the at least one machine-readable indicia are static and are printed on the wearable article.

In some embodiments, the at least one machine-readable indicia are dynamic and are presented via a display device associated with the wearable article.

In some embodiments, the at least one machine-readable indicia are configured for one-time use.

In some embodiments, the at least one machine-readable indicia are dynamically associated with at least one financial account.

In some embodiments, the at least one machine-readable indicia are at least one of reloadable, disposable, prepaid, temporal, or permanent.

In some embodiments, an amount of at least one of funds, points, benefits, rewards, or virtual currently is allocated to and associated with the at least one machine-readable indicia from the financial payment account.

In some embodiments, an unused amount of funds allocated to and associated the at least one machine-readable indicia is configured to be deposited into the financial payment account associated with the machine-readable indicia.

In some embodiments, the at least one machine-readable indicia is read by the mobile communication device via at least one of a smart phone camera, a mobile device camera, a laptop camera, a tablet camera, a near field communication (NFC) device, a radio frequency identification (RFID) device, or a laser bar code scanner.

In some embodiments, a user is enabled to configure the assignment of at least the financial payment account and the at least one limit to the at least one readable indicia via an application associated with or accessible by the mobile communication device.

In some embodiments, the portion is waterproof.

In some embodiments, the portion further comprises at least one of a computing device, a processing device, a memory device, a communications device and a display, wherein the portion is configured to communicate with the mobile communication device via at least one of wireless communications, near field communication (NFC), radio frequency identification (RFID), a camera, or a scanner.

In some embodiments, at least one of the wearable device or the mobile communication device is configured to communicate with and transfer payment information regarding a financial transaction to at least one of a point of sale terminal, a computer, a smart phone, a mobile device, a tablet, a laptop computer, or a server associated with a financial institution.

In some embodiments, the one or more limits include at least one of a spending limit, a limit based on spending behavior, a limit based on location of at least one of a merchant, the person, or the wearable device, a limit based on a purchase category, a limit based on a purchase type, a limit based on an item category, a limit based on an item type, a limit based on a purchase amount, a limit based on a purchase frequency, a limit based on a period of time, a number of transactions, or a combination of limits.

In some embodiments, the machine-readable indicia includes at least one of a quick response (QR) code, a bar code, a string of characters, a near-field communication (NFC) device, a radio frequency identification (RFID) device, a number, text, an icon, or an image.

In some embodiments, the machine-readable indicia is capable of at least one of being updated, changed, replaced, or modified by a user.

In some embodiments, payment information includes at least one of an account number, a routing number, a customer number, a customer name, a merchant number, a merchant name, an account balance, a purchase amount, a withdrawal amount, a deposit amount, a tax amount, a time and date of transaction, location information associated with the transaction and merchant, a password, a username, or an authentication credential.

In some embodiments, a method for facilitating a financial transaction utilizing a wearable device as a payment vehicle, wherein the wearable device is associated with one or more financial accounts and is configured to facilitate a financial transaction using at least one of the one or more financial accounts, is provided. The method comprises retrieving, via a sensor associated with a second device, at least one readable indicia associated with the wearable device, wherein the readable indicia comprises payment information associated with the financial transaction. The method further comprises receiving, via a computing device, payment information from the readable indicia, wherein the payment information includes at least a purchase amount. The method further comprises processing, via a computing device, payment information, wherein processing the payment information includes determining that the one or more financial accounts associated with the wearable device includes an amount of funds at least equal to the purchase amount. The method further comprises executing, via a computing device, the transaction in response to determining that the amount of funds included in the one or more financial accounts associated with the wearable device is at least equal to the purchase amount.

In some embodiments, a computer-program product for facilitating a financial transaction using a wearable device as a payment vehicle wherein the wearable device is associated with one or more financial accounts and is configured to facilitate a financial transaction using at least one of the one or more financial accounts, is provided. The computer program product comprises a non-transitory computer-readable medium comprising code causing a first apparatus to retrieve, via a sensor associated with a second device, at least one readable indicia associated with the wearable device, wherein the readable indicia comprises payment information associated with the financial transaction. The code also causes the first apparatus to receive, via a computing device, payment information from the readable indicia, wherein the payment information includes at least a purchase amount. The code then causes the first apparatus to process, via a computing device, payment information, wherein processing the payment information includes determining that the one or more financial accounts associated with the wearable device includes an amount of funds at least equal to the purchase amount. Lastly, the code causes the first apparatus to execute, via a computing device, the transaction in response to determining that the amount of funds included in the one or more financial accounts associated with the wearable device is at least equal to the purchase amount.

BRIEF DESCRIPTION OF THE DRAWINGS

Figure 1C:
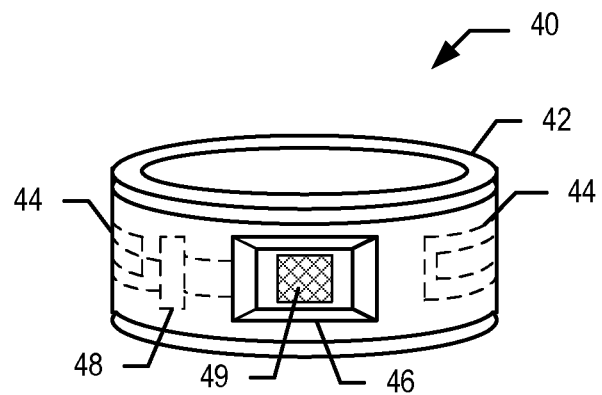
Figure 1D:
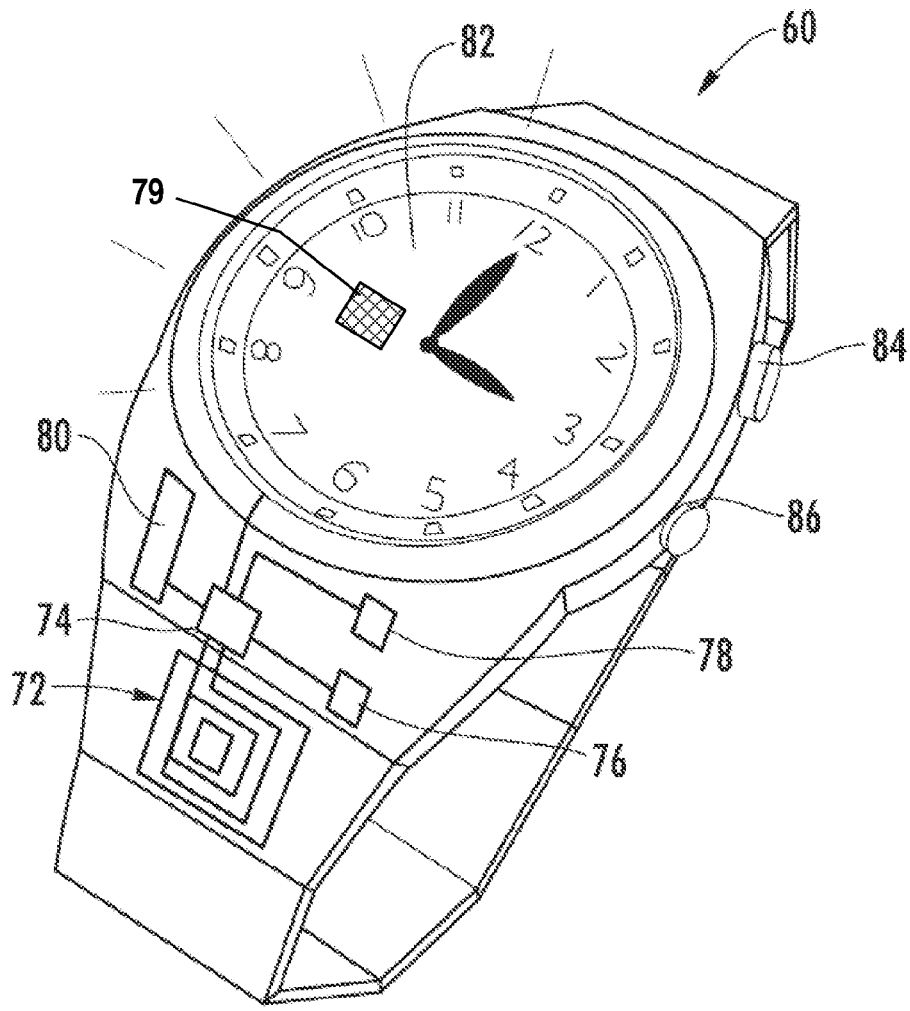
Figure 2A:
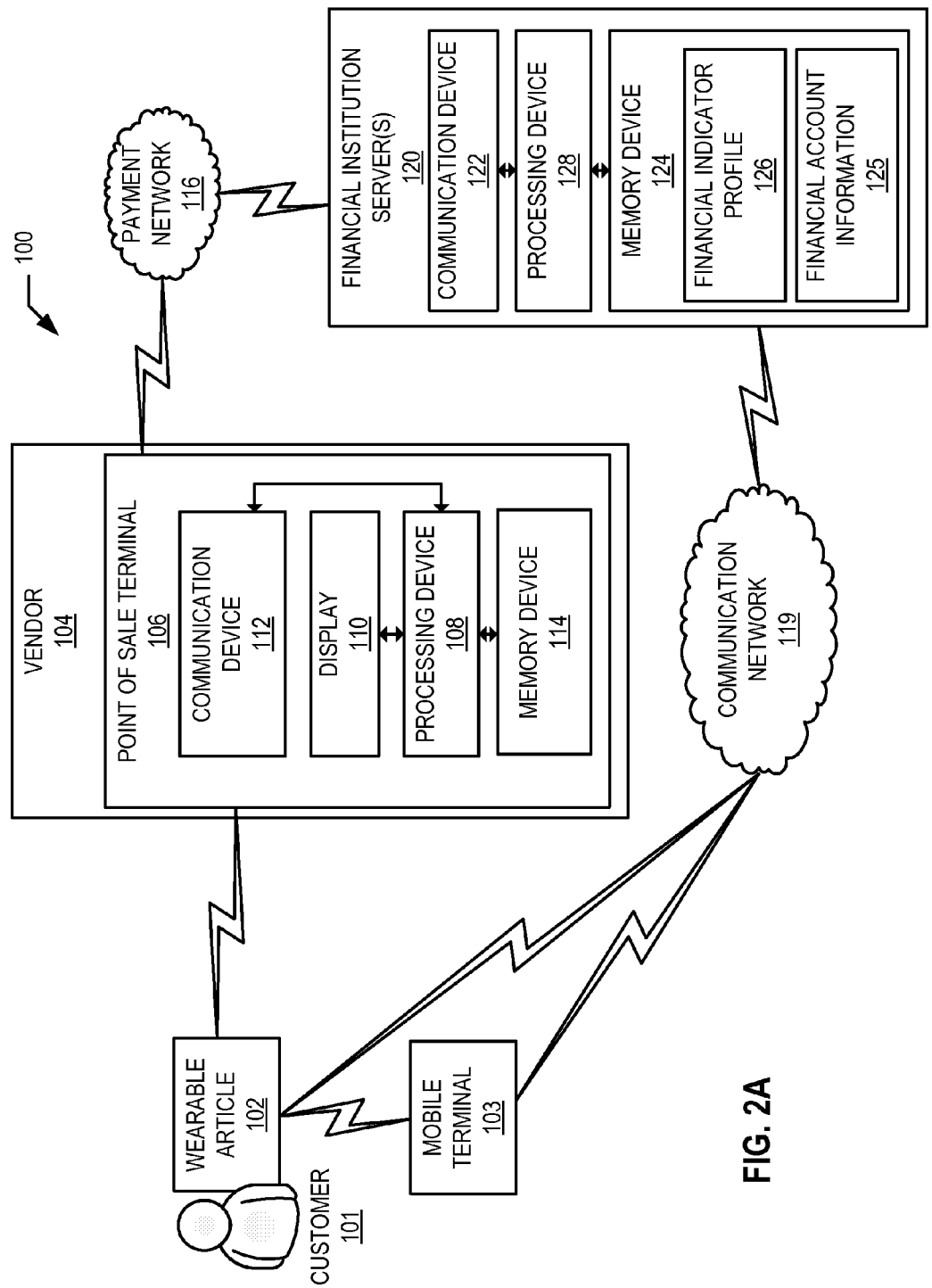
Figure 2B:
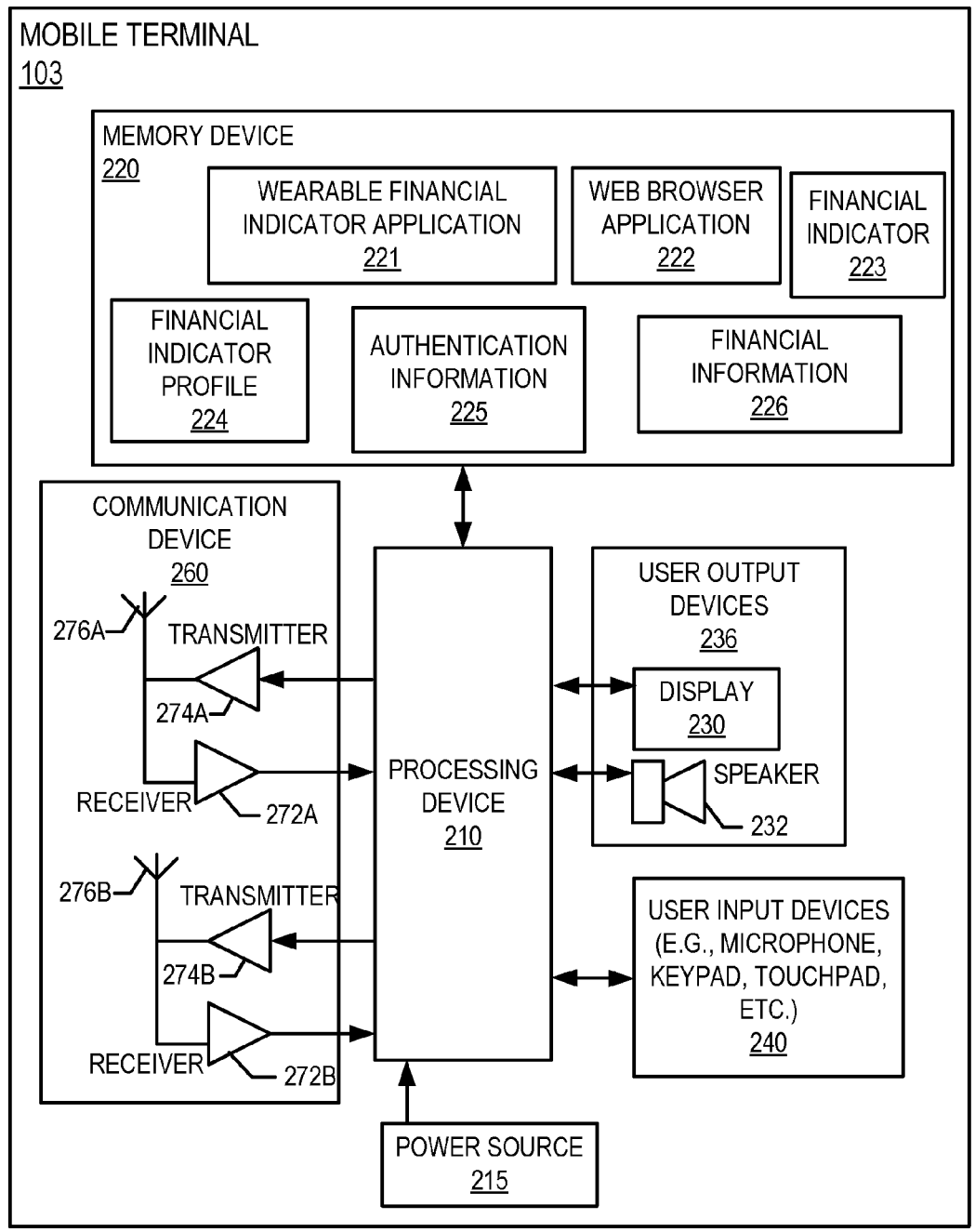
Figure 3:
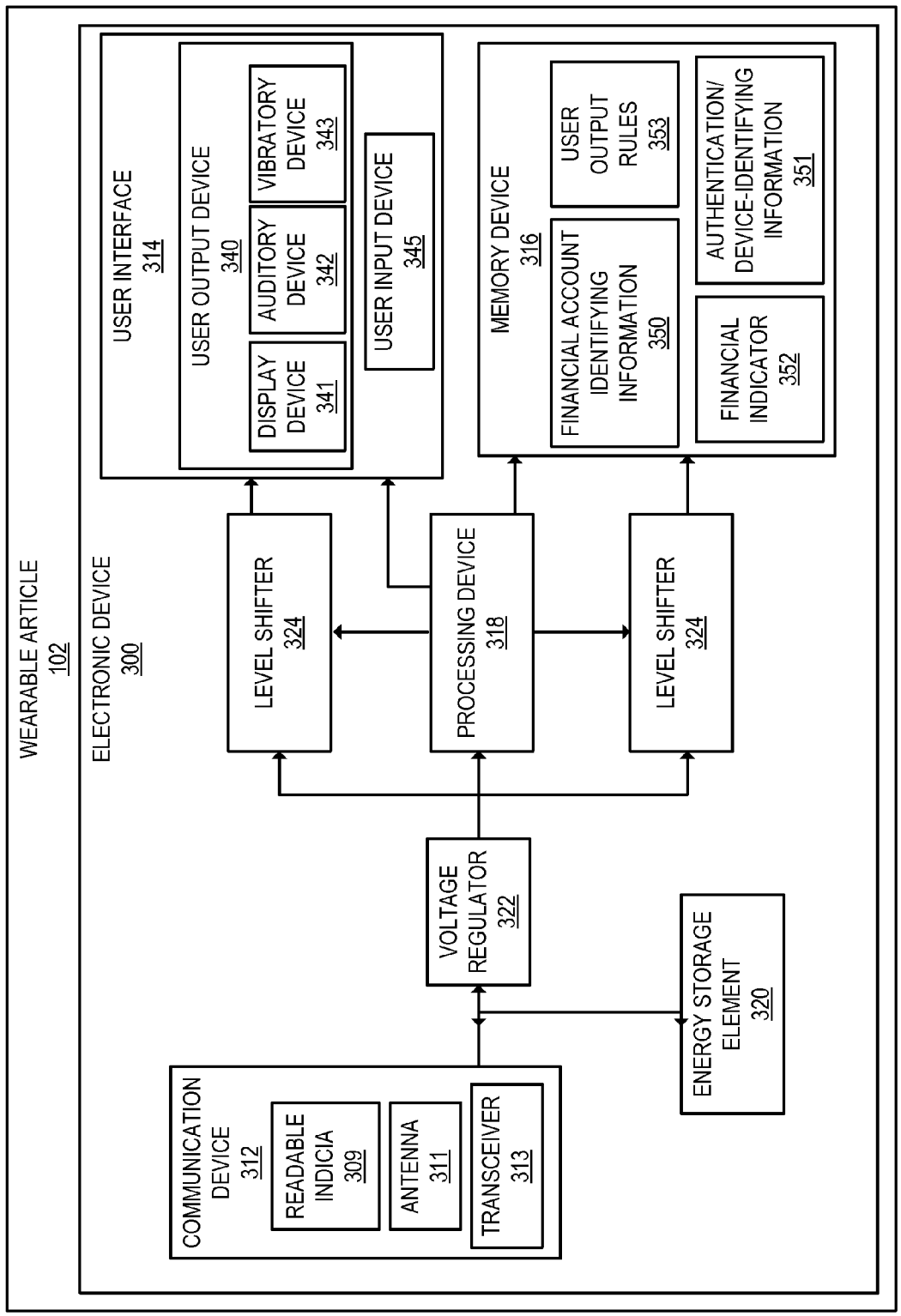
Figure 5:
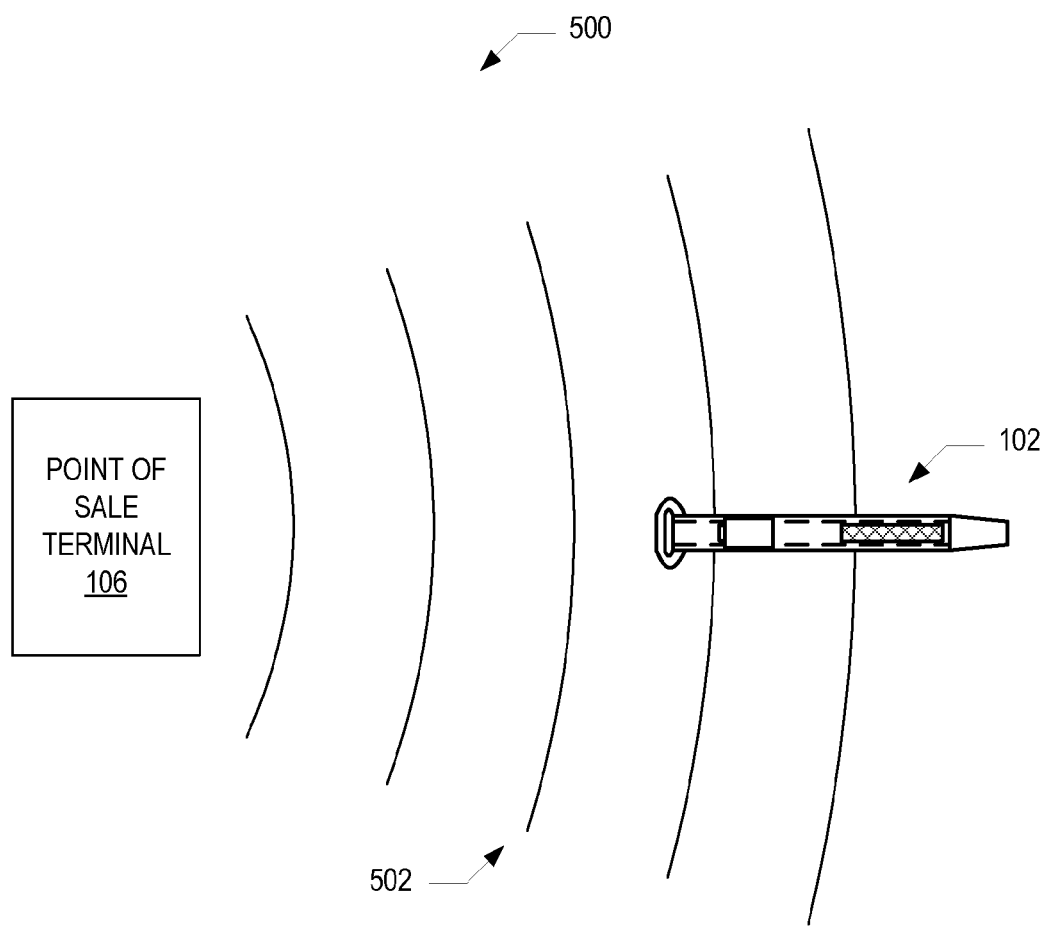
Figure 6:
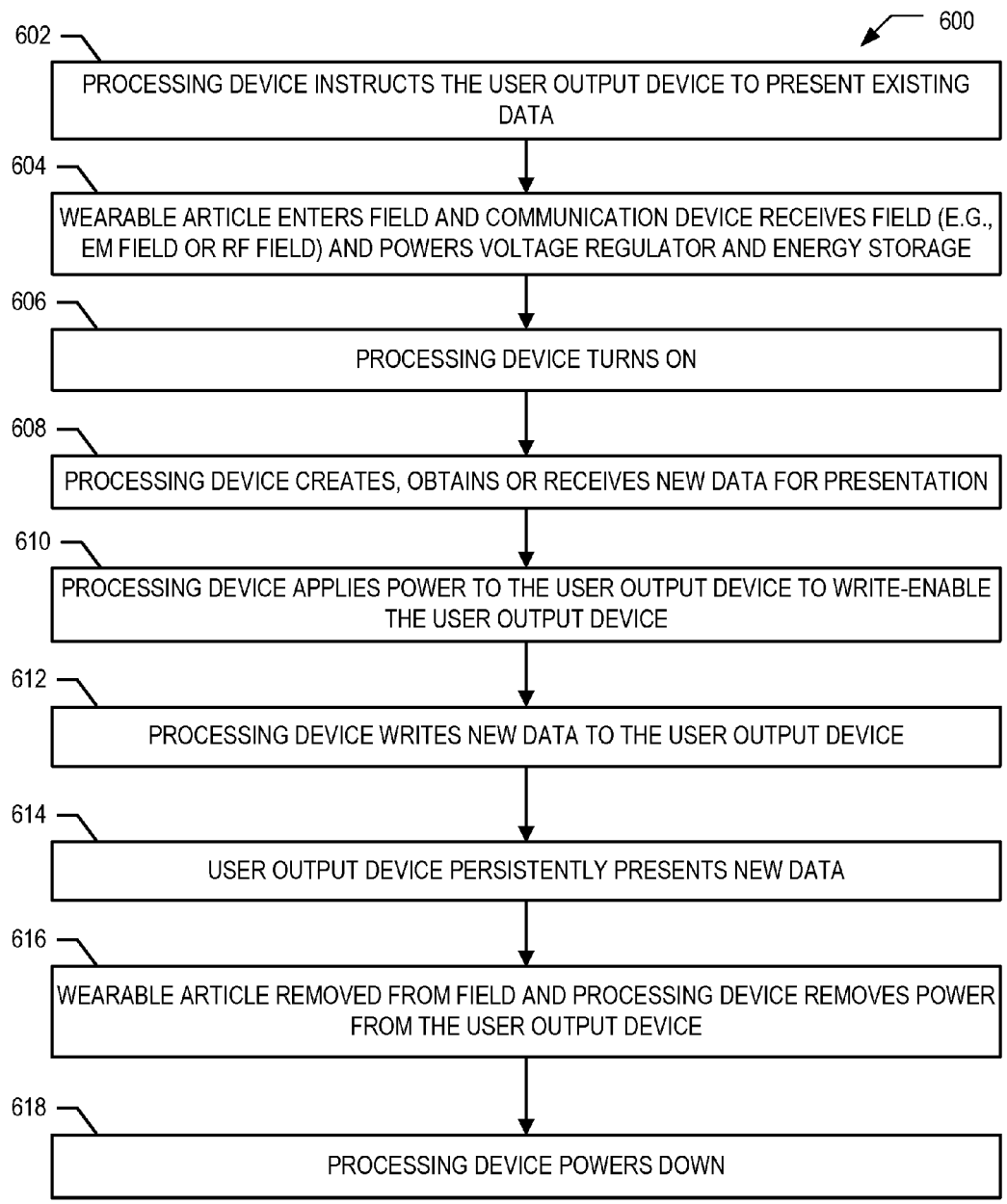
Figure 7:
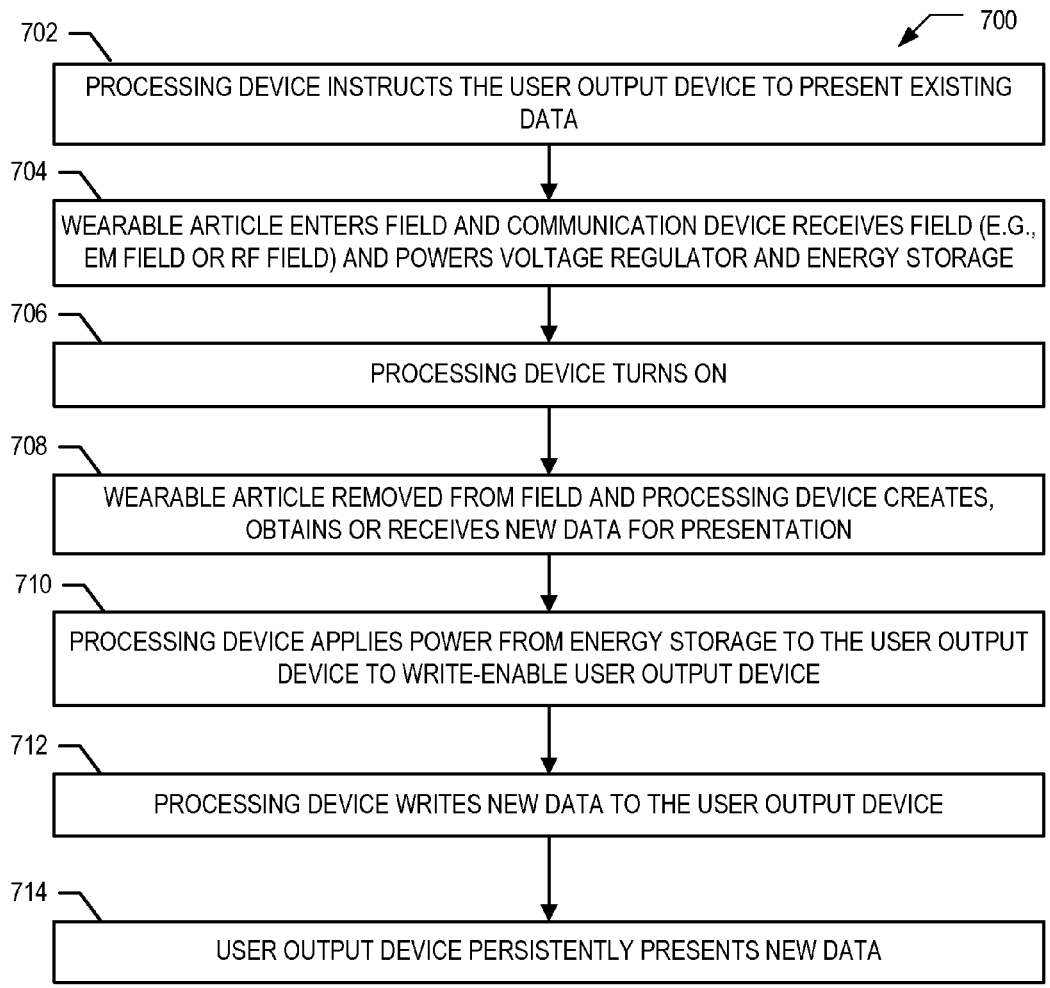
Figure 8:
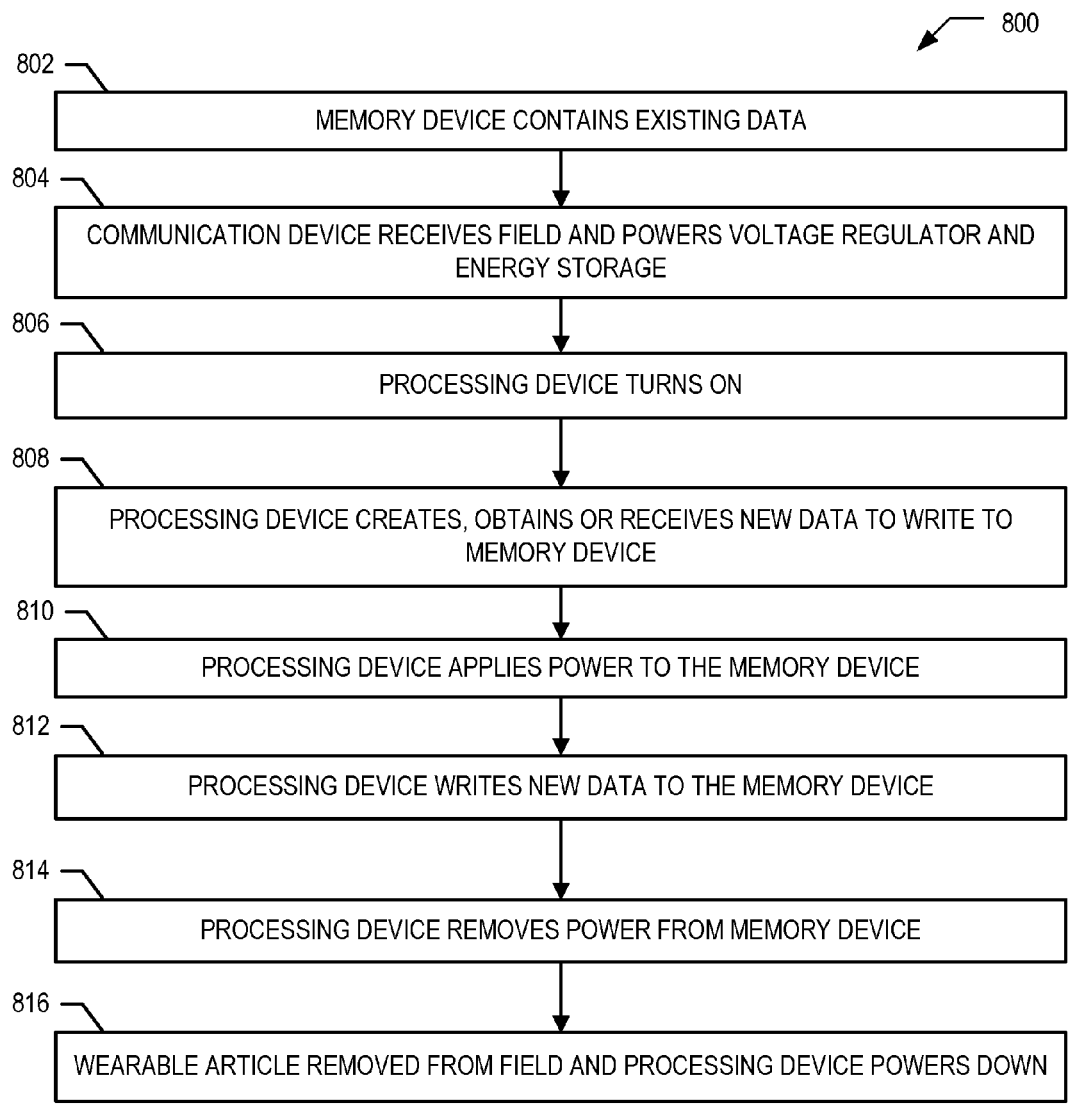
Figure 9:
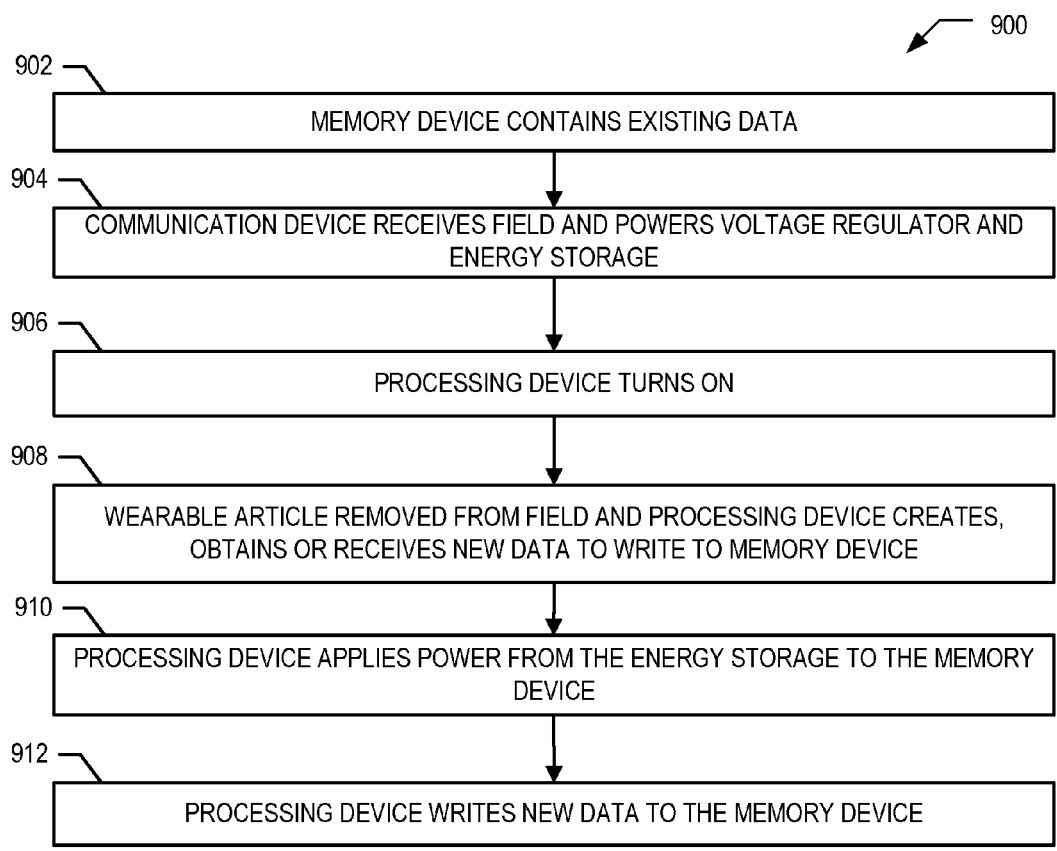
Figure 10:
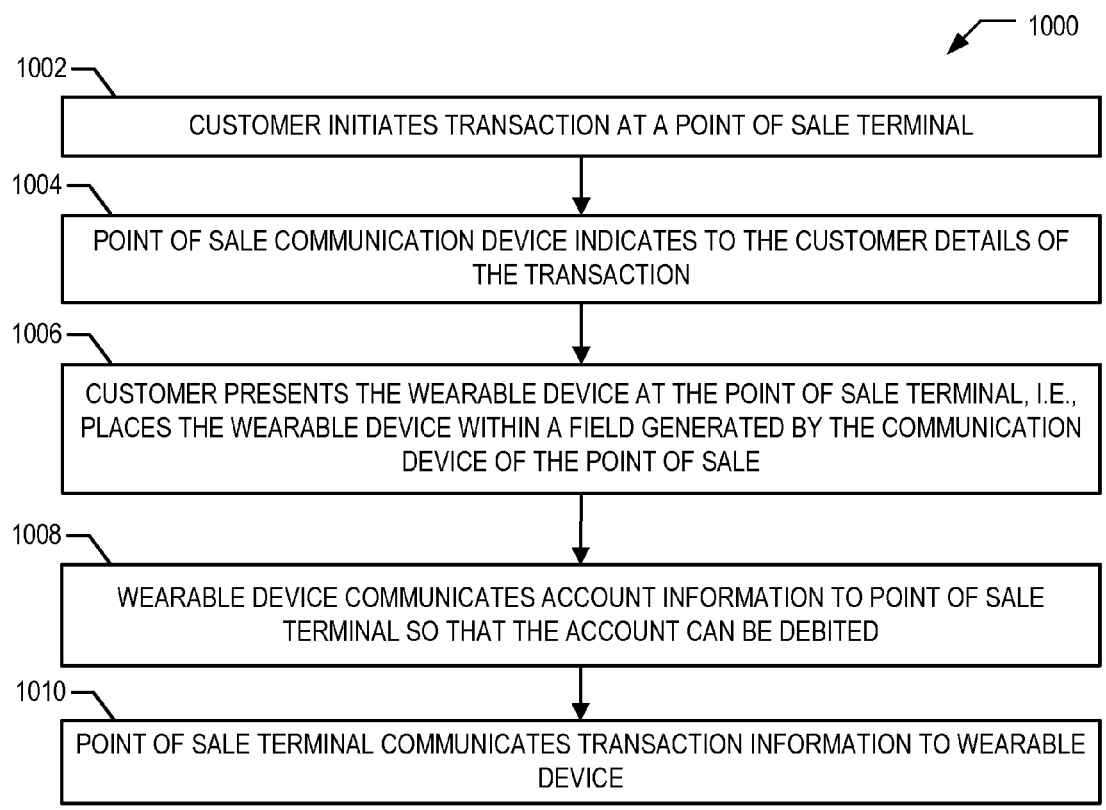
Figure 11:
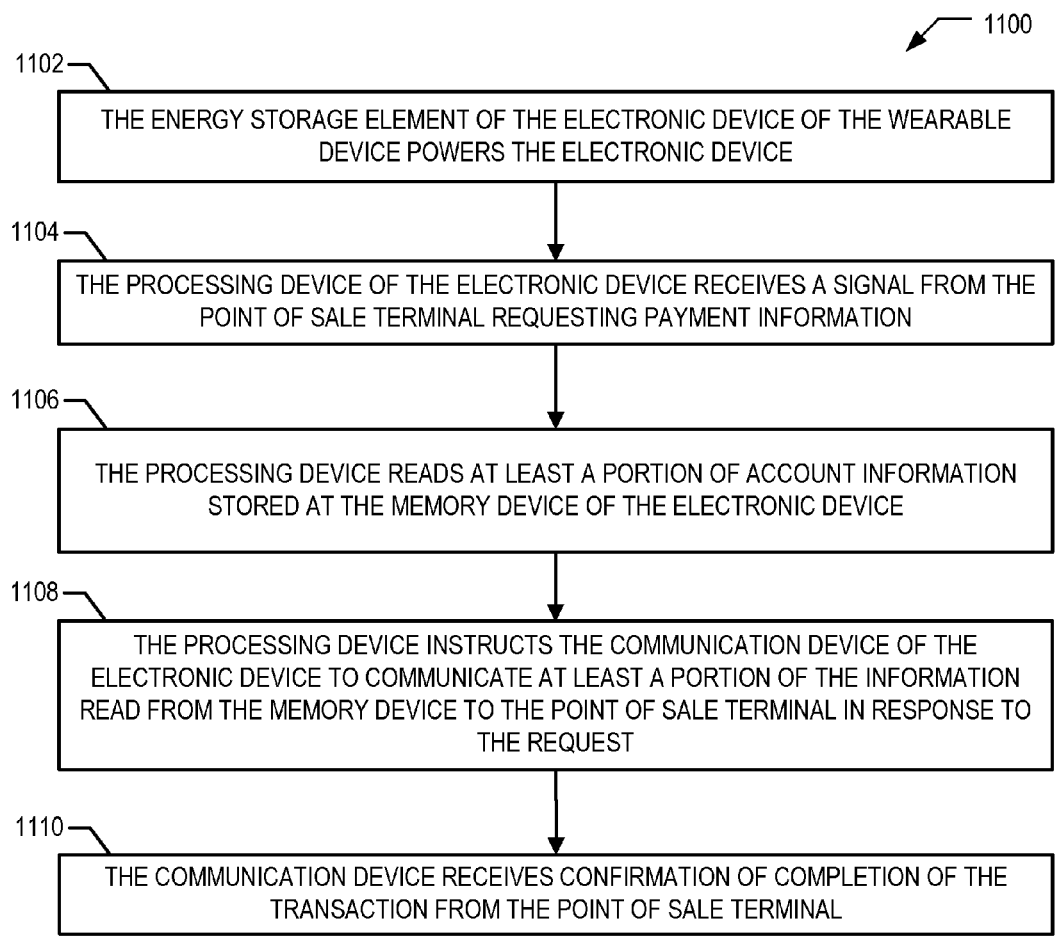
Figure 12:
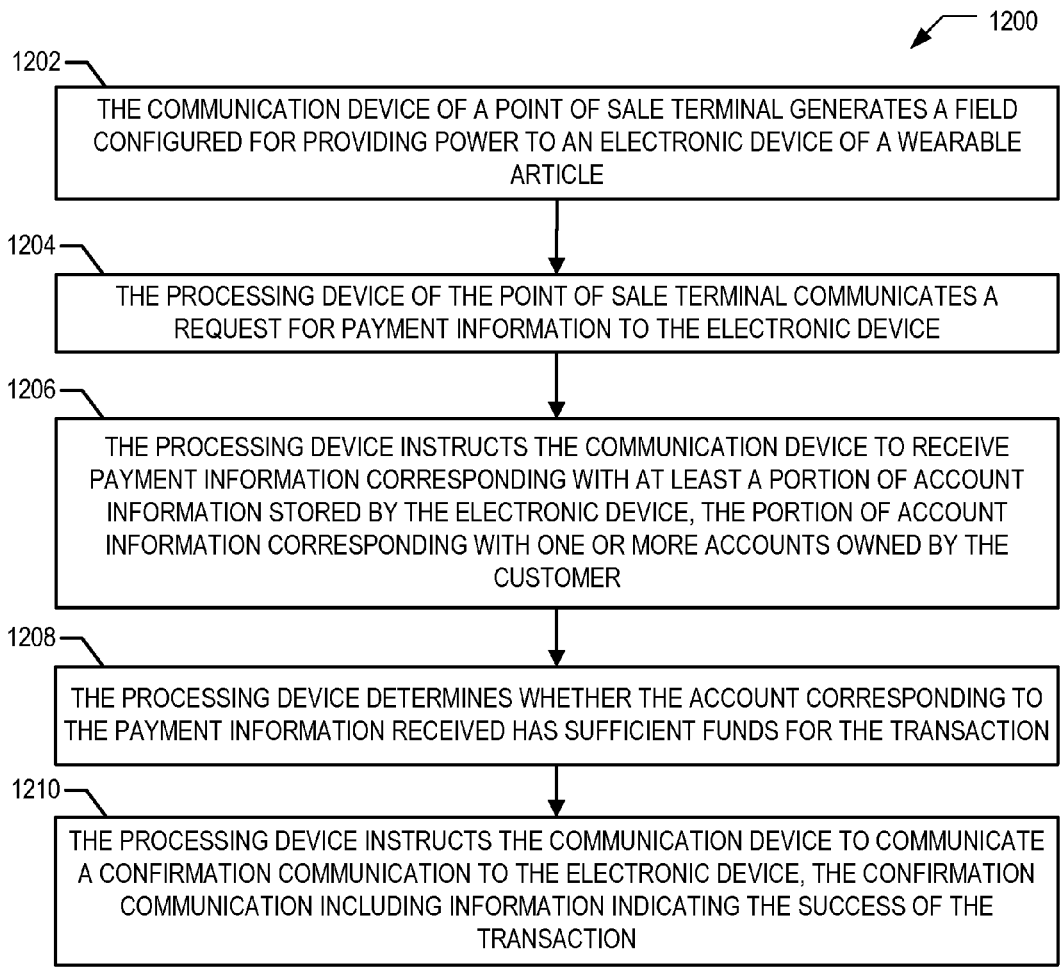
Figure 13:
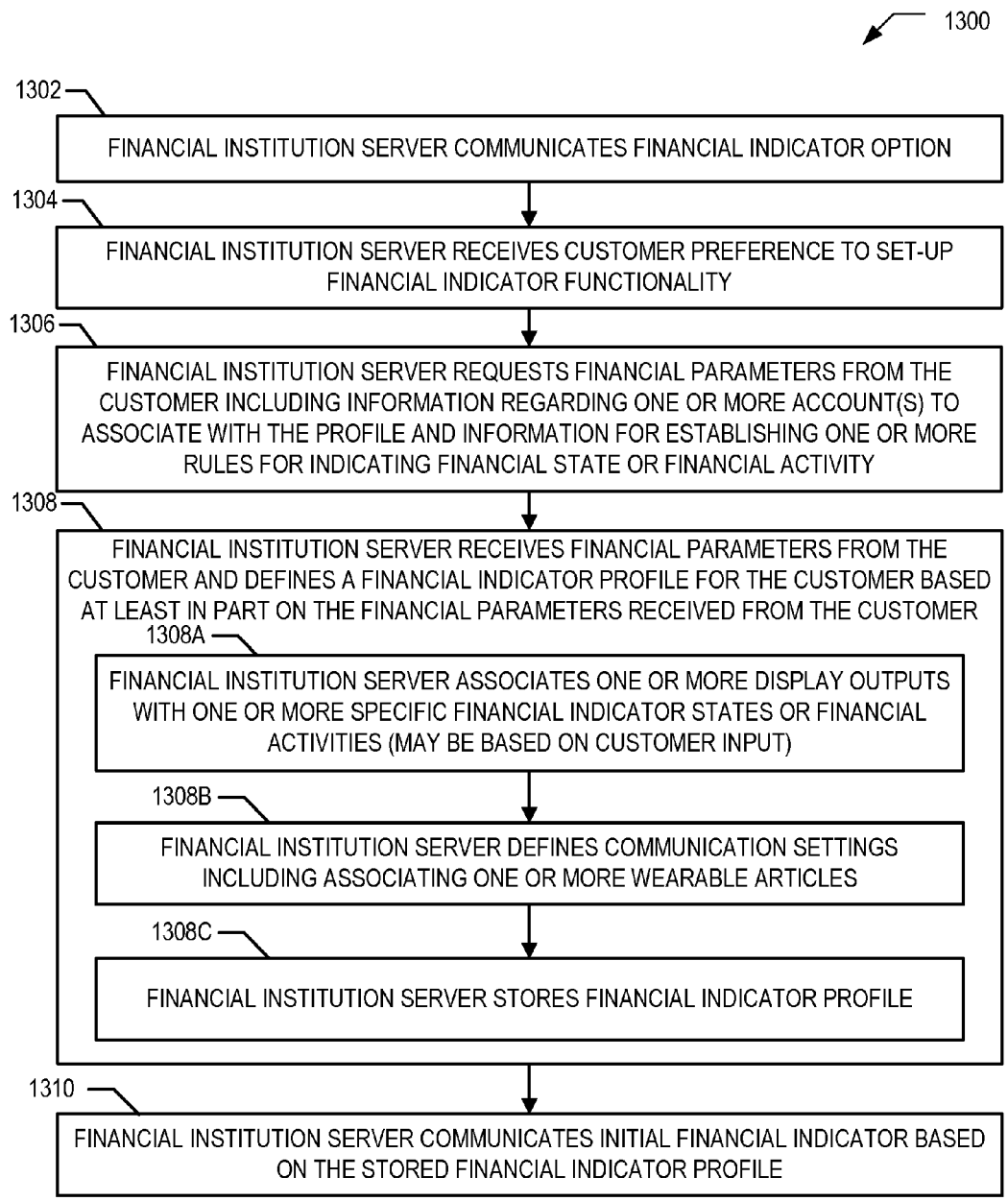
Figure 14:
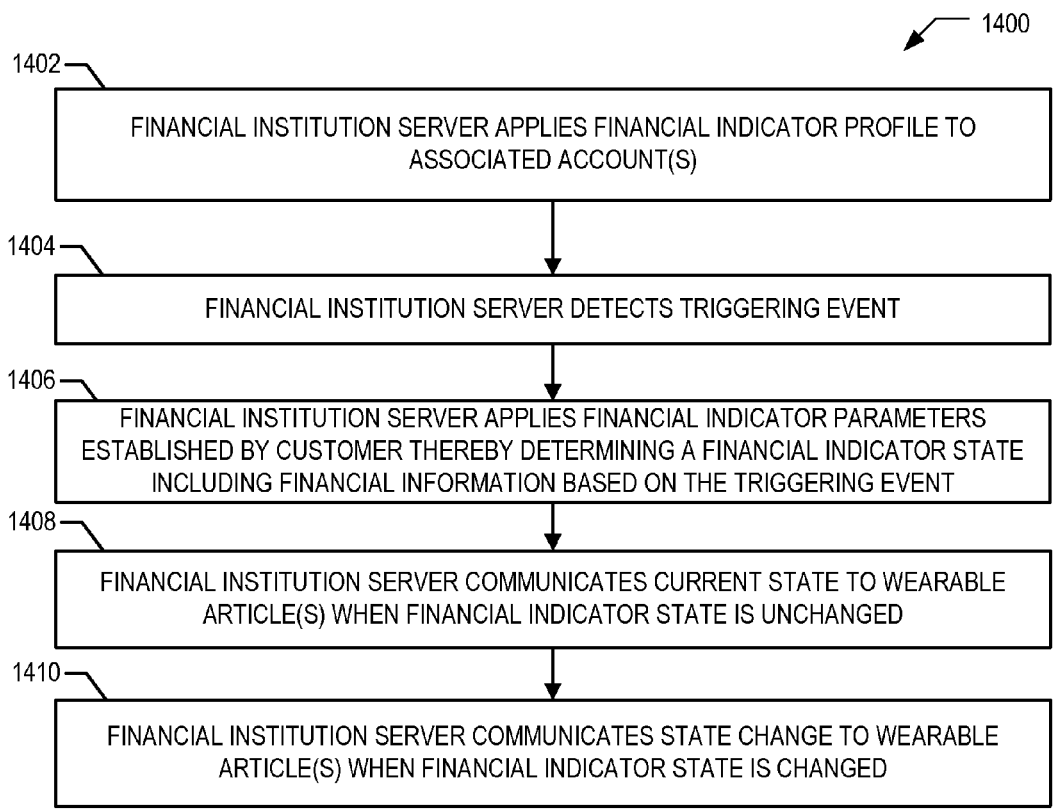
Figure 15:
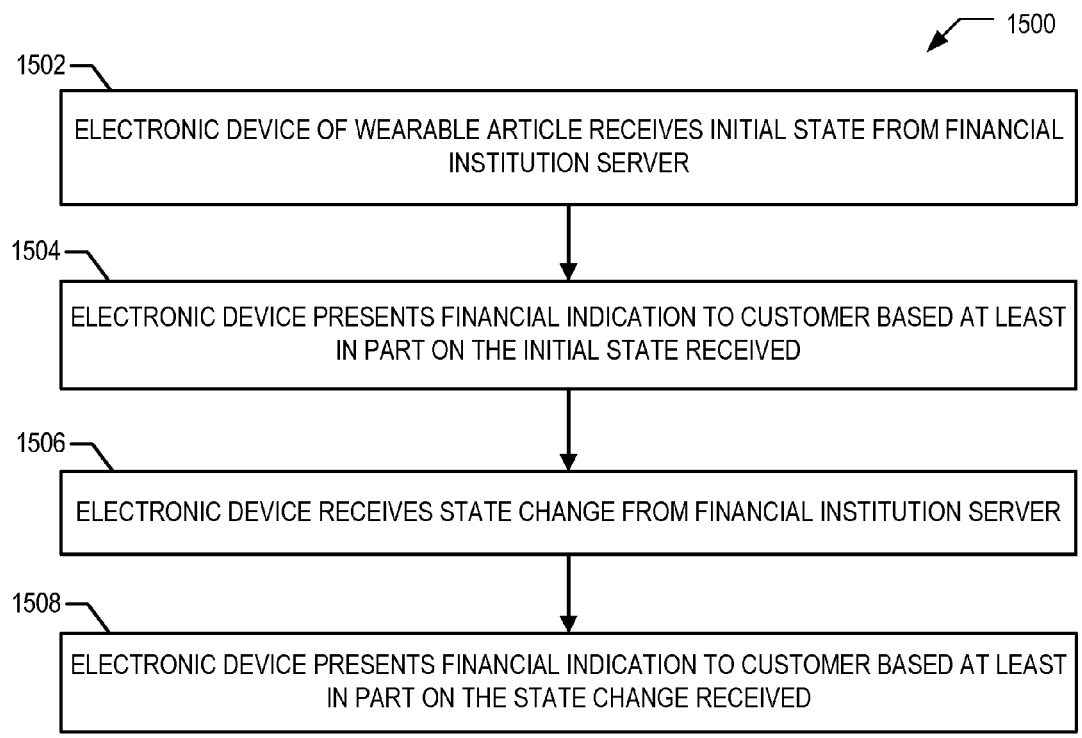
Figure 16:
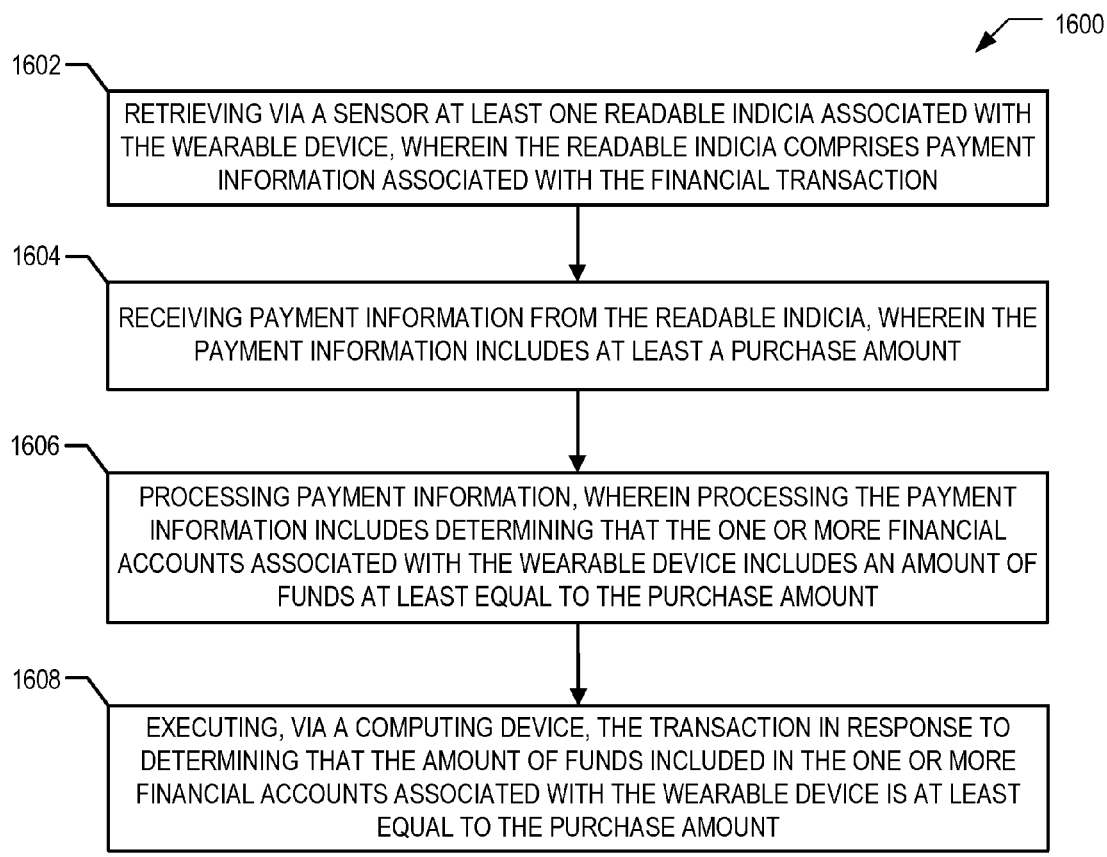

Having thus described embodiments of the invention in general terms, reference will now be made to the accompanying drawings, wherein:

FIGS. 1A and 1B provide an bottom and top illustration, respectively, not necessarily drawn to scale, of an example embodiment of the invention where a wristband is configured to be used as a contactless payment device, in accordance with an embodiment of the invention;

FIG. 1C is an illustration, not necessarily drawn to scale, of an example embodiment of the invention where a ring is configured to indicate current financial information to a customer by changing colors based on the customer's financial health state, in accordance with an embodiment of the invention;

FIG. 1D is an illustration, not necessarily drawn to scale, of an example embodiment of the invention where a watch is configured to indicate current financial information to a customer by having the face change colors based on financial health state of one or more customer financial accounts, by having a vibratory device vibrate when a transaction occurs involving the one or more customer financial accounts, and where the watch can also be used as a contactless payment device, in accordance with an embodiment of the invention;

FIG. 2A is a block diagram of a wearable article environment according to some embodiments of the present invention;

FIG. 2B is a block diagram of a mobile terminal having a wearable article application in accordance with some embodiments of the present invention;

FIG. 3 is a block diagram of a wearable article according to some embodiments of the present invention;

FIGS. 4A and 4B illustrate an example wearable article having a band and an electronic device according to some embodiments of the present invention;

FIG. 5 is an illustration of an external power source environment according to some embodiments of the present invention;

FIGS. 6 and 7 are flowcharts illustrating methods for changing the state or contents of a user output device on a wearable article using power received from an external source according to embodiments of the present invention;

FIGS. 8 and 9 are flowcharts illustrating methods for controlling a memory device of an electronic device embedded on or in a wearable article according to embodiments of the present invention;

FIGS. 10-12 are flowcharts illustrating methods for providing payment information to a point of sale terminal during a transaction according to embodiments of the present invention;

FIGS. 13-15 are flowcharts illustrating methods for indicating financial information to the customer according to embodiments of the present invention; and FIG. 16 is an exemplary process flow for utilizing a wearable device as a payment vehicle according to embodiments of the present invention.

DETAILED DESCRIPTION OF EMBODIMENTS OF THE PRESENT INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Embodiments of the invention provide for a wearable article configured as a payment vehicle (e.g., for providing payment information to a point of sale terminal during a transaction). The wearable article, in some embodiments, includes a band configured for wrapping around a body part (e.g., a wrist) of a customer and for carrying readable indicia (e.g., a quick response (QR) code, a bar code, or the like) or an electronic device (e.g., a computer) and includes an attachment system for removably securing the band to the body part of the customer. In some embodiments, the readable indicia are associated with one or more financial accounts so that the user may utilize the band to facilitate a financial transaction using at least one of the one or more financial accounts. In other embodiments, the electronic device includes an energy storage element, a memory device, a communication device and a processing device. The processing device is configured for receiving a communication from a second apparatus (e.g., a point of sale terminal, a server or storage location associated with a payment application or operating system, a smart phone payment application or operating system, or other means for payment) requesting payment information for completion of the transaction. The processing device reads account information from the memory device and communicates payment information to the second apparatus. In alternative embodiments, the wearable article receives power from a field generated by the second apparatus.

FIGS. 1A, 1B, 1C, and 1D illustrate three embodiments of the invention described herein. As illustrated by the example shown in FIGS. 1A and 1B some embodiments of the invention provide wearable articles that a customer can use as a contactless payment device when making a transaction at a point-of-sale (POS) or via a second apparatus (e.g., a smart phone). Embodiments of the present invention. As illustrated by the example shown in FIG. 1C some embodiments of the invention provide wearable articles that can indicate financial information to a customer. As illustrated by the example shown in FIG. 1D some embodiments of the invention provide wearable articles that can both indicate financial information to a customer and be used by the customer as a contactless payment device.

More particularly, FIGS. 1A and 1B provide an illustration, not necessarily drawn to scale, of an example embodiment of the invention where a wristband 1A is configured to be used as a contactless payment device, in accordance with an embodiment of the invention. In the illustrated example, the wristband 1A includes a system for fastening the wristband 1A around the wrist, ankle, or other body part of a customer. The example fastening system includes an elongate band 15 having several holes 22 therein that allow for sizing of the wristband. The fastening system also includes a pin 24, a tab 26, and a hole 20 in the tab 26. The elongate band 15 is wrapped around the customer's wrist and the pin 24 is placed through one of the holes 22. The tab 26 is then doubled over itself and the hole 20 is fastened to the pin 24 to hold the elongate band 15 onto the pin and thereby hold the wristband 1A in a loop around the customer's wrist.

As illustrated in FIG. 1A, the example wristband 1A further includes a wider payment device portion 10 that has an electronic device that functions as a contactless payment device (e.g., a contactless debit or credit card). In this example embodiment, the wristband 1A includes an antenna 8 for communicating with a POS terminal. The wristband 1A also includes a chip 5 operatively coupled to the antenna 8. The chip 5 generally has a processing device and a memory device. The memory device has account identifying information stored therein that the processor can communicate, using the antenna 8, to a POS terminal so that the POS terminal can use the account identifying information to communicate with the customer's financial institution when processing a financial transaction (such as a purchase transaction). The antenna 8 may also be used to power-up the chip 5 when the antenna 8 is placed in an electromagnetic field. For example, the antenna 8 and chip 5 may use known radio frequency (RF) transmission and modulation technology for communicating and/or powering. Such an example embodiment may be waterproof and suitable for customers to take to the pool or beach where customers often desire to have access to their accounts but do not want to take their wallets.

As illustrated in FIG. 1B, the portion 10 of the wristband 1B may also have information printed thereon that allows the customer to identify the wristband 1B. For example, the wristband 1B may have such information 30 written thereon as the logo of the customer's bank, the customer's name, the last four digits of the customer's corresponding credit or debit card number or account number, and an indication of the type of account associated with the wristband (e.g., "credit" or "debit"). The wristband 1B also includes readable indicia 9 such as a quick response (QR) code, a bar code, an image-readable code, a scanable image, icon, picture, or text, or the like. The readable indicia 9 may be directly associated with a financial account associated with the customer so that upon scanning or reading of the readable indicia 9, information associated with the associated financial account is retrieved by, received by, transmitted to a point-of-sale terminal or other payment collection device (e.g., an online payment application on a smart phone).

FIG. 1C is an illustration, not necessarily drawn to scale, of another example embodiment of the invention where a ring 40 is configured to indicate current financial information to a customer by changing colors based on the customer's financial health state, in accordance with an embodiment of the invention. In the illustrated example, the ring 40 (the "wearable financial indicator" in this example) includes a ring 42 for wearing on the customer's finger. Embedded in the ring 42 are an antenna 44 or other communication device and a processing device 48. Operatively coupled to the processing device 48 and the antenna 44 is a display device 46 in the form of a jewel on the ring. The antenna 44 is configured to receive a financial indicator associated with certain current financial information about the customer's one or more financial accounts. The antenna 44 may be configured to wirelessly receive the financial indicator from a financial institution's server via a wireless communication network and/or from the customer's mobile phone or other device. The processing device 48 then changes the color of the display device 46 based on the financial indicator received by the antenna 44. For example, the display device 46 may include one or more light emitting diodes (LEDs), a liquid crystal display (LCD), or other display technology covered by or embedded in a glass or polymeric jewel. In this way, changing the color of the display 46 changes the color of the jewel on the ring 42. The customer, by having created the color system and the associated thresholds, knows that, in this example: (1) if the jewel is red, then the customer is above the customer's pre-defined spending threshold for the day; (2) if the jewel is yellow, then the customer is near the day's pre-defined spending threshold; and (3) if the jewel is green, then the customer is well below the day's spending threshold. The display device 46 in FIG. 1C is also configured to display readable indicia 49 which may be scanned, captured, or the like via a second apparatus used for payment collection or transfer (e.g., a POS terminal or a smart phone).

FIG. 1D is an illustration, not necessarily drawn to scale, of an example embodiment of the invention where a watch 60 is configured to indicate current financial information to a customer by having the face 82 change colors based on the financial health state of one or more customer financial accounts, by having a vibratory device 80 vibrate when a transaction occurs involving the one or more customer financial accounts, and where the watch can also be used as a contactless payment device, in accordance with an embodiment of the invention. In the illustrated example, the watch 60 (the "wearable financial indicator and payment device" in this example) includes a watch 62 for wearing on the customer's wrist. Embedded in the watch 62 are an antenna 72 or other communication device, a memory device 76, a power unit 78, and a processing device 74. Operatively coupled to the processing device 74 is a display device 82 in the form of a watch face. The antenna 72 is configured to receive a financial indicator associated with certain current financial information about several of the customer's financial accounts. The antenna 72 may be configured to wirelessly receive the financial indicator from a financial institution's server via a wireless communication network and/or from the customer's mobile phone or other device. The processing device 74 then changes the color of the watch face 82 and/or activates the vibratory device 80 based on the financial indicator received by the antenna 72. For example, in one embodiment of the invention: (1) if the clock face is blue, then customer's account balance is currently above a customer-defined threshold balance; and (2) if the clock face is white, then customer's account balance is currently below the customer-defined threshold balance. In one embodiment, every time the customer's account is involved in a transaction, the processing device 74 activates the vibratory device 80 to vibrate the watch for a short period of time to inform the customer that a transaction was just made. In one embodiment of the invention, the watch 62 also includes a button 84 or other user input device that allows the customer to cycle between the customer's different financial accounts. An indicator may be displayed on the watch face 82 to show the customer which of the customer's accounts are being indicated at a given time. Furthermore, the display device 82 in FIG. 1D is also configured to display readable indicia 79 which may be scanned, captured, or the like via a second apparatus used for payment collection or transfer (e.g., a POS terminal or a smart phone).

In this example embodiment, the watch 60 can also be used as a payment device during a transaction with a POS terminal. In such an embodiment, the memory device 76 includes account identifying information that the processing device 74 communicates to a POS terminal using the antenna 72. In one embodiment, the processing device 74 only communicates account identifying information wirelessly when the customer holds down the button 86. In this way the customer can hold the button down when in close proximity to a POS terminal's antenna, but also be confident that others cannot attempt to wirelessly hack into the customer's wearable payment device when the button 86 is not depressed. Alternatively, the readable indicia 79 can be scanned at the POS terminal (or via another apparatus), wherein financial information tied to an account associated with the readable indicia 79 is transmitted to the POS terminal to complete execution of a transaction.

The three example embodiments of the invention described with regard to FIGS. 1A, 1B, 1C, and 1D are merely examples and it will be understood that embodiments of the invention are not limited to these examples. In this regard, embodiments of the invention are now described more generally herein below with reference to the other figures.

Referring now to FIG. 2A, a block diagram of one embodiment of a wearable article payment environment 100 is shown. In the example environment 100, a customer 101, such as a customer of a financial institution, wears a wearable article 102 having point of sale payment functionality and/or financial indicator functionality.

With regard to the payment functionality, the wearable article 102 communicates, such as by wireless communication, with a vendor's 104 point of sale terminal 106 via the point of sale terminal's 106 communication device 112. The point of sale terminal 106, in the embodiment shown, also includes a processing device 108 operatively coupled to the communication device 112, as well as a display 110, a memory device 114, and/or other devices or components for interacting with the customer 101. The processing device 108 is configured for controlling the communication device 112, the display 110, the memory device 114, and/or the other devices or components for interacting with the customer 101.

The processing device 108 reads the memory device 114 having computer-readable program code stored thereon. The computer-readable program code includes, in some embodiments, code for instructing the communication device 112 for communicating with the wearable article 102. In some embodiments, the computer-readable program code includes code for instructing the communication device 112 for communicating across a payment network 116 with the financial institution, such as with the financial institution servers 120. The payment network 116, in some embodiments, includes one or more computing systems such as, for example, one or more servers maintained by one or more financial institutions. In some embodiments, the payment network 116 includes one or more backend systems maintained by a financial institution such as, for example, a bank. The backend systems include, in some embodiments, one or more servers or other computing devices and include one or more databases including, in some embodiments, information 125 regarding one or more customer accounts.

With regard to the financial indicator functionality, in some embodiments the wearable article 102 communicates across a communication network 119 with one or more of the financial institution servers 120. For example, in various embodiments, the wearable article 102 communicates with the financial institution's communication device 122 via readable indicia. In some such embodiments, the wearable article 102 may be configured to receive communications, i.e., "financial indicators," from the financial institution servers 120 regarding financial information (e.g., financial health state information, financial activity information, and/or the like) corresponding to one or more accounts associated with the customer carrying the wearable article 102. Thereby, the wearable article 102 is configured to communicate the financial information regarding the customer's account(s) to the customer.

In some embodiments of the invention, the wearable article 102 communicates with the financial institution servers 120 via a mobile terminal 103 that may be possessed, held, owned, and/or maintained by the customer 101, such as smart phone, a laptop, a tablet, a computer, or the like. In this regard, the mobile terminal 103 may include a near-field wireless communication device for communicating with the wearable article 102 located a short distance away from the mobile terminal 103, and a far-field wireless communication device (such as a wireless telephony antenna) for communicating with the financial institution servers 120 located a greater distance away over the communication network 119. In some embodiments, the mobile terminal 103 merely relays communications between the financial institution servers 120 and the wearable article 102. In other embodiments, however, the mobile terminal 103 may play a more active role by authenticating the customer to the financial institution servers 120, processing financial information received from the servers 120 and outputting the financial indicator or other user out instructions to the wearable device, creating or storing the customer's financial indicator profile, and/or the like. FIG. 2B provides a block diagram of a mobile terminal 103 in accordance with some embodiments of the invention. In other embodiments, the mobile terminal 103 is configured to scan, capture, or read readable indicia associated with the wearable article 102, as well as initiate the transmission or receipt of information associated with the readable indicia.

The communication network 119, in various embodiments, is or includes a wireless network and is or includes a Wi-Fi network, one or more cellular networks (e.g., GSM networks) or other wireless networks, one or more wired networks, local area networks (LANs), wide area networks (WANs), and/or global area networks (GANs). The communication network 119, in some embodiments, is connected to one or more intranets and/or the Internet in order to communicate with the financial institution servers 120. For example, in some embodiments of the invention, the wearable article 102 communicates with the financial institution servers 120 whenever it is in a public or private Internet hotspot.

The financial institution server(s) 120 include a processing device 128 communicably coupled with a communication device 122 for communicating over the communication network 119 with the mobile terminal 103 and/or the wearable article 102. The financial institution server 120 communication device 122 may also be configured to communicate with the payment network 116 to facilitate payment debits and credits, for example, during a transaction at a POS terminal 106, virtual currency credits, points associated with a reward system, or the like. The processing device 128 is also communicably coupled with a memory device 124 configured to store a financial indicator profile 126 and/or financial account information 125. The processing device is configured to access the memory device in order to execute computer-readable program code or other code stored thereon, such as the financial indicator profile 126 and/or the financial account information 125.

The financial indicator communicated to the wearable article 102 and, thereby, to the customer 101, relates to financial information of interest to the customer 101, such as interest about one or more of the customer's financial accounts and/or financial market information of interest to the customer 101. For example, in some embodiments, the financial indicator provides information about a financial health state which is information about status/state of a customer account or a group of customer accounts or about the customer's finances or financial interests generally. The status may include information about balances in individual accounts, balances across multiple accounts, available credit in individual accounts, available credit across multiple accounts, amount of money spent, transferred, or received during a particular time period for one or multiple accounts, interest on one or more accounts, fees on one or more accounts, savings information on one or more accounts, customer's net worth, customer cash flow metrics, customer savings metrics, customer's household, business, or organization financial metrics, and/or the like. In some embodiments, the financial indicator provides information about financial activity which is information about transactions involving or changes in the financial accounts associated with the customer or the customer's financial interests generally. The customer financial accounts may include, for example, credit accounts, deposit accounts, checking accounts, savings accounts, money market accounts, demand deposit accounts, investment accounts, business/commercial accounts, school accounts, shared accounts, linked accounts, rewards accounts, individual accounts, fundraising accounts, and/or the like.

In some embodiments of the invention, financial indicators or other user output instructions are provided to the wearable article 102 in accordance with a pre-established financial indicator profile, such as the financial indicator profile 126 stored in the memory device 124 of the financial institution server 120 in the embodiment of FIG. 2A. The financial indicator profile determines which types of financial information should be communicated to the customer 101 via the wearable article 102 and how the information should be presented to the customer 101. The financial indicator profile may include information about the particular type of wearable article 102 that the customer 101 has and information about which types of financial information are associated with which types of user output of the wearable article 102. The financial indicator profile may be stored in the wearable article 102, the customer's mobile terminal 103, and/or in the financial institution servers 120. In some embodiments the financial indicator profile is standardized or created by the financial institution, where in other embodiments the financial indicator profile is at least partially customer-defined. In some embodiments, the financial indicator profile may be executed by the processing device 210 of the mobile terminal 103, the processing device 128 of the financial institution server 120 and/or the processing device 318 (see FIG. 3 and related discussion below) of the wearable article 102. In that regard, any or all of the wearable article 102, the financial institution server 120, and/or the mobile terminal 103 in various embodiments, performs some or all of the processing to output the financial indicator as discussed herein.

FIG. 2B is a block diagram of the mobile terminal 103 in accordance with some embodiments of the present invention. In one embodiment of the invention, the mobile terminal 103 is a mobile telephone (e.g., a smart phone). However, it should be understood that a mobile telephone is merely illustrative of one type of mobile terminal 103 that may benefit from, employ, or otherwise be involved with embodiments of the present invention, and, therefore, should not be taken to limit the scope of embodiments of the present invention. Other types of mobile terminal 103 may include portable digital assistants (PDAs), pagers, mobile televisions, gaming devices, laptop computers, cameras, video recorders, audio/video players, radios, GPS devices, or any combination of the aforementioned.

The mobile terminal 103 generally includes a processing device 210 communicably coupled to such devices as a memory device 220, user output devices 236, user input devices 240, a communication device 260, and a power source 215. The processing device 210 generally includes circuitry for implementing communication and/or logic functions of the mobile terminal 103 or other system/device with which the processing device is communicably coupled, such as, for example, the financial article 102. For example, the processing device 210 may include a digital signal processor device, a microprocessor device, and various analog to digital converters, digital to analog converters, and/or other support circuits. Control and signal processing functions of the mobile terminal 103 are allocated between these devices according to their respective capabilities. The processing device 210 thus may also include the functionality to encode and interleave messages and data prior to modulation and transmission. The processing device 210 can additionally include an internal data modem. Further, the processing device 210 may include functionality to operate one or more software programs, which may be stored in the memory device 220. For example, the processing device 210 may be capable of operating a connectivity program, such as a web browser application 222. The web browser application 222 may enable the mobile device 200 to transmit and receive web content, such as, for example, location-based content and/or other web page content, according to a Wireless Application Protocol (WAP), Hypertext Transfer Protocol (HTTP), one or more security/encryption protocols, and/or the like. The processing device 210 may be further capable of operating a wearable financial indicator application 221 that instructs the processing device 210 to perform the wearable financial indicator communication and processing functions that are described herein with regard to some embodiments of the invention.

The processing device 210 is configured to use the communication device 260 to communicate with the wearable article 102 and one or more other devices on the communication network 119, such as with the financial institution server 120. In this regard, the communication device 260 may include two different types of communication devices, one for near field communication with the wearable article 102 and one for far-field communication with the financial institution server 120. For example, the mobile terminal 103 may include a far-field antenna 276A operatively coupled to a far field transmitter 274A and a far-field receiver 272A (together a "transceiver"). The processing device 210 is configured to provide signals to and receive signals from the transmitter 274A and receiver 272A, respectively. The signals may include signaling information in accordance with the air interface standard of the applicable cellular system of a wireless telephone network. In this regard, the mobile terminal 103 may be configured to operate with one or more air interface standards, communication protocols, modulation types, and access types. By way of illustration, the mobile terminal 103 may be configured to operate in accordance with any of a number of first, second, third, and/or fourth-generation communication protocols and/or the like. For example, the mobile terminal 103 may be configured to operate in accordance with second-generation (2G) wireless communication protocols IS-136 (time division multiple access (TDMA)), GSM (global system for mobile communication), and/or IS-95 (code division multiple access (CDMA)), with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The mobile terminal 103 may also be configured to operate in accordance with non-cellular communication mechanisms, such as via a near-field communication devices, via near-field antenna 276B, near-field transmitter 274B, and near-field receiver 272B. For example, the near-field antenna 276B and transceiver may use known radio frequency modulation and transmission technology, infrared technology, or other short range wireless technology and/or standards (e.g., the Bluetooth® communication standard) to communication information to and/or from the wearable article 102. The mobile terminal 103 may also be configured to temporarily power-up the wearable article 102 when it sends the wearable article 102 a transmission by modulating a short-range electromagnetic field.

As described above, the mobile terminal 103 has a user interface that is, like other user interfaces described herein, made up of user output devices 236 and/or user input devices 240. The user output devices 236 include a display 330 (e.g., a liquid crystal display or the like) and a speaker 232 or other audio device, which are operatively coupled to the processor 210. The user input devices 240, which allow the mobile terminal 103 to receive data from a user such as the customer 101, may include any of a number of devices allowing the mobile terminal 103 to receive data from a user, such as a keypad, keyboard, touch-screen, touchpad, microphone, mouse, joystick, other pointer device, button, soft key, and/or other input device(s).

The mobile terminal 103 further includes a power source 215, such as a battery, for powering various circuits and other devices that are used to operate the mobile terminal 103.

The mobile terminal 103 also includes a memory device 220 operatively coupled to the processing device 210. As used herein, memory includes any computer readable medium (as defined herein below) configured to store data, code, or other information. The memory 220 may include volatile memory, such as volatile Random Access Memory (RAM) including a cache area for the temporary storage of data. The memory 220 may also include non-volatile memory, which can be embedded and/or may be removable. The non-volatile memory can additionally or alternatively include an electrically erasable programmable read-only memory (EEPROM), flash memory or the like.

The memory 220 can store any of a number of applications which comprise computer-executable instructions/code executed by the processing device 210 to implement the functions of the mobile terminal 103 described herein. For example, the memory 220 may include such applications as a conventional web browser application 222 and/or a wearable financial indicator application 221. These applications may provide a graphical user interface (GUI) on the display 230 that allows the customer 101 to communicate with the consumer mobile terminal 103, the financial institution server 120, the wearable article 102, and/or other devices. In some embodiments, the applications may allow a customer 101 to create a financial indicator profile, allow a customer 101 to authenticate him or herself to the server 120, and/or relay communications in short range to/from the wearable article 102 using a first protocol, for example, near field communications, and/or relay communications in long range to/from the financial institution server 120 using a second protocol.

The memory 220 can also store any of a number of pieces of information, and data, used by the mobile terminal 103 and the applications and devices that make up the mobile terminal 103 or are in communication with the mobile terminal 103 to implement the functions of the mobile terminal 103 and/or the other systems described herein. For example, the memory 220 may include such data as the wearable financial indicator application 221, the web browser application 222, the financial indicator 223, the financial indicator profile 224, the authentication information 225, and/or the financial information 226. The wearable financial indicator application 221 includes instructions/code for instructing the processing device 210 to perform the wearable financial indicator communication and processing functions that are described herein with regard to some embodiments of the invention. The web browser application 222 includes instructions/code for instructing the processing device 210 to present a browser to the customer, such as, for navigating the World Wide Web (WWW) and/or navigating a financial institution website and/or online banking functionality provided by the website. The financial indicator 223 includes instructions/code for instructing the processing device 210 to provide an indication to the customer, such as described elsewhere herein, for example, in the form of a visual, audible, audio-visual or other financial indicator. In some embodiments, the financial indicator 223 is configured to instruct the processing device 210 to provide instructions to the wearable article 102, and in other embodiments, the financial indicator 223 is stored at the wearable article 102 and is configured to instruct the processing device of the wearable article 102. In some embodiments, both the mobile terminal 103 and the wearable article 102 have financial indicators, such as financial indicator 223 configured to interact and collectively instruct the wearable article 102 present the indicator to the customer. The financial indicator profile 224 as discussed elsewhere herein includes information regarding the customer's preferences and/or other settings with regard to indication and instructions based thereon, such as, for example, communication protocols used to communicate the financial indicator from the mobile device 103 to the wearable article 102.

Referring to FIG. 3, a block diagram of one embodiment of the wearable article 102 of FIGS. 1A-D and 2A is shown. The wearable article 102 generally includes an electronic device 300 portion that is configured to perform the communication and/or logic portions of the wearable article 102. The electronic device 300 may be, in whole or in part, coupled to, embedded in, placed in, and/or formed integrally with the other portions of the wearable article 102. The electronic device 300 includes, in various embodiments, a communication device 312, a user interface 314 for communicating with the customer 101, and a memory device 316 for storing data and/or computer-executable program code. In various embodiments, the electronic device 300 includes a processing device 318, energy storage elements 320, a voltage regulator 322, and one or more level shifters 324. In some embodiments, the communication device 312 includes an antenna 311 and in some it includes a transceiver 313, wherein one or both of the antenna 311 and/or transceiver 313 are configured for short and/or long range communication. The communication device also includes readable indicia 309, which include but are not limited to a scanable code, a quick response (QR) code, image-readable code, a bar code, an image, picture, icon, or text, or the like, that is integrated with the electronic device 300 and its associated. The readable indicia 309 may be electronic or electronically produced via a user interface 314 (or more specifically a user output device 340 which includes a display device 342). In other embodiments, the readable indicia 309 is printed onto the wearable article 102 or is printed onto a sticker adhesive that is coupled to the wearable article 102. In some embodiments, the user interface 314 includes a user output device 340 having one or more of a display device 341, an auditory device 342, a vibratory device 343, some other output device or the like. In some embodiments, the user interface 314 includes a user input device 345 for receiving user input. In some embodiments, the memory device is configured to store computer-readable or computer-executable instructions and/or code. In the embodiment shown, the memory device 316 includes financial account information 350, user output rules 353, financial indicator 352 and an authentication/device-identifying information 351. The financial account information 350 includes, in various embodiments, information regarding one or more of the customer's accounts. The user output rules 353 include instructions for providing output to the customer. The financial indicator 352 includes instructions for providing a financial indicator to the customer, such as, for example, an indication when a transaction is performed on a customer's account. The authentication/device-identifying information 351 includes data and/or instructions regarding authenticating the customer with another system, such as the financial institution server 120, for example. In other embodiments, the information 350 includes device-identifying information 351, such as, for example, an identifier identifying the wearable article 102. For example, in one embodiment, each wearable article 102 and/or each electronic device 300 is associated with an identification number used in communication with one or more other systems. In various embodiments, the wearable article 102 may or may not include some or all of the components and instructions/code shown in the example embodiment of FIG. 3. For example, in some embodiments, the wearable article 102 is a payment device and may or may not include a display. In other embodiments, for example, the wearable article 102 is a financial indicator and may or may not have account identifying information, or may only include readable indicia 309. In various other embodiments, numerous combinations of the discussed components and/or instructions are included.

In some embodiments of the wearable article 102, the communication device 312 of the electronic device 300 is configured for receiving an external signal from a field 502, typically initiated at a point of sale terminal 106 as illustrated in FIG. 5. FIG. 5 illustrates an external power source environment 500. The field 502, in various embodiments, is an electro-magnetic (EM) field, a radio frequency (RF) field, some other wireless communication field, or the like. The communication device 312 is also configured for converting the electro-magnetic signal 502 to electrical power (i.e., an electrical signal) for powering the electronic device 300. A processing device 318 may be coupled (directly or indirectly) with the electrical signal of the communication device 312. The processing device 318 may generate one or more data signals, a portion of the data signals may be coupled with the user interface 314, and another (or the same) portion of the data signals may be coupled with the memory device 316. For example, the user interface 314, in one embodiment, receives power (directly or indirectly) from or derived from the electrical signal from the communication device 312. The memory device 316, in some embodiments, receives power (directly or indirectly) from or derived from the electrical signal from the communication device 312. Responsive to the signal from the field 502 received by the electronic device 300, in some embodiments, data can be presented by the user interface 314, and the data stored by the memory device 316 can be changed.

In one example, the output of the communication device 312 is a voltage signal, such as a DC voltage, which may include but is not limited to a low voltage such as, for example, approximately 1.25 volts. In some embodiments, for example, the electronic device 300 includes a voltage regulator 322. The voltage regulator 322 is coupled with output of the communication device 312. The voltage regulator provides a stable or regulated output voltage for use by other components within the electronic device 300. For example, the voltage regulator 322, in one embodiment, includes circuit elements such as diodes, resistors, and/or capacitors for stabilizing the output signal received from the communication device 312. The voltage regulator 322, in some embodiments, is also configured for providing a regulating voltage to the other components within the electronic device 300. The voltage regulator 322, in some embodiments, includes other circuits and/or components configured for providing a regulated voltage and/or configured for stabilizing the voltage on the output of the voltage regulator 322.

The electronic device 202 includes or is coupled with one or more energy storage elements 320, also referred to as energy storage circuits, in some circumstances. The energy storage elements 320, in some embodiments, are coupled with the output of the communication device 312. In one embodiment, for example, the energy storage element 320 couples with the communication device output in order to store energy received from the communication device 312 and provide the energy to the input of the voltage regulator 322. Alternatively or additionally in various embodiments, energy storage elements 320 are coupled with the output of the voltage regulator 322 so as to store energy and provide energy to the components downstream of the voltage regulator 322 within the electronic device 300. The energy storage elements 320, in some embodiments, include capacitors, inductors, or other energy storage elements or circuits configured for providing energy storage.

In some embodiments, for example, one or more level shifters 324, also referred to as voltage conversion circuits or voltage translator circuits, are configured to provide or create the voltage levels utilized by the user interface 314 and/or by the memory device 316. In an alternative embodiment, a voltage regulator 322 is configured to provide multiple output voltage signals 332. In such an embodiment, each output voltage signal is a different voltage level in order to supply various voltage levels as required by multiple components of the electronic device 300, such as, for example, the processing device 318, the user interface 314, and/or the memory device 316 and/or other components. In some embodiments, the one or more level shifters 324 use other circuits and/or mechanisms configured for shifting a voltage signal.

In some embodiments, the communication device 312 receives a signal from the field 502 generated by the communication device 112 (FIG. 2A) of the point of sale terminal 106, for example. In some embodiments, the signal from the field 502 is converted into electric power having varying characteristics configured such that it can be utilized by the circuit components of the electronic device 300. The processing device 318 is activated by the electric power received from the field 500 in some embodiments.

The processing device 318, in some applications, changes the state of the user interface 314 by writing data to the user output device 340 (as discussed with reference to FIGS. 6-7 below). In some such applications, the communication device 112 receives a financial indicator or instructions to provide a financial indicator from one or both of a mobile terminal 103 and/or a financial institution server 120 (as discussed with further detail with reference to FIGS. 13-15 below) Likewise the processing device 318, in another applications, changes the state of the memory device 316 by writing data (as discussed with further detail with reference to FIGS. 8-9 below). Furthermore, in another application, the processing device 318 reads the memory device 316 and communicates a customer's account information to the point of sale terminal 106 in response to a request for payment information from the point of sale terminal 106 during a transaction (as discussed with reference to FIGS. 10-12 below).

Referring again to the embodiment shown in FIG. 3, the processing device 318 is powered, for example, based on the energy received from the external source of communication device 112 of the point of sale terminal 106 (FIG. 2A) initiating the field 502. The processing device 318, in various embodiments, has one or more outputs. In one embodiment, for example, one or more outputs are coupled to the user interface 314 and provide control signals from the processing device 318 to the user interface 314. In some embodiments, the outputs include data signals and control signals, and in other embodiments, the outputs include only one or the other. In some embodiments, the outputs include control signals configured for controlling the memory device 316. The processing device 318, in some embodiments, includes other outputs which can be utilized to activate or de-activate other circuit elements within the electronic device 300, such as to selectively enable or selectively disable circuit sections of the electronic device 300 in order to conserve energy or efficiently utilize energy. The processing device 318 in various embodiments is compliant with the publicly available standards and/or specifications such as, for example, one or more of the specifications managed, maintained and enhanced by EMVCo, LLC.

The user interface 314, in various embodiments, is collocated with the electronic device 300 on the wearable article 102, and in other embodiments, the user interface 314 is coupled with the electronic device 300 but is located separate from the electronic device 300 on or in the wearable article 102. In some embodiments, the display device 341 of the user interface 314 is or includes a persistent display which, once written, will display the desired data and will persistently maintain the display of that data until the display is re-written or otherwise changed. The display device 341, in some embodiments, is a fixed segment display, a dot matrix display, a positive or negative reflective display which can be read by the user or cardholder using ambient light, a liquid crystal display, or other display. In other embodiments, the display device 341 is a single indicator such as a light emitting diode (LED). In some embodiments, the display device 341 includes one or more indicators configured to provide different colors intended to communicate different messages to the customer. In some embodiments, the wearable article 102 is configured for communicating financial health to the customer as discussed in further detail below. In some such embodiments, the display device 341 includes one or more indicators configured for multiple color light emission. In some embodiments, for example, the display device 341 is a single indicator configured to emit red light when the customer's account is overdrawn or within some predetermined amount of being overdrawn. Similarly, in another embodiment, for example, the display is a single indicator configured to emit a yellow light when the customer's account is within some predetermined amount of being overdrawn, and in yet another embodiment, for example, the display is a single indicator configured to emit a green light when the customer's account is outside a predetermined amount of being overdrawn. In various other embodiments, the wearable device 102 includes one or more additional indicator devices such as auditory devices 342, for example speakers and the like, and/or vibratory devices 343. Such additional indicator devices can be used, in some embodiments, in lieu of a display device 341 for indicating the financial information to the customer or some other information, or can be used in conjunction with the display device 341 in other embodiments.

Referring now to FIGS. 4A and 4B, another embodiment of the wearable article 102 is shown. In this embodiment, the wearable article 102 includes a band 400 configured to be worn proximate the customer's wrist and/or ankle. In various other embodiments, the band 400 is or includes a ring, a necklace, or some other article for wrapping or otherwise being worn by a customer. In the embodiment shown as well as some other embodiments, the customer can swap the electronic device 300 out with another electronic device 300. For example, in one embodiment, one electronic device 300 corresponds with one customer and/or one or more accounts owned by the one customer and a second electronic device 300 corresponds with the same customer or a different customer and/or one or more other accounts of the first customer and/or the different customer. In this regard, the wearable article 102 can be used by multiple customers and/or by one customer for multiple and/or different accounts. In other instances, it may be advantageous to replace the wearable article 102 without having to replace the electronic device 300. For example, in one embodiment, the wearable article 102 is worn and therefore needs replacement, but the electronic device 300 continues to function properly. In this case, the wearable article 102 can be replaced and the electronic device 300 can be retained for use with a replacement wearable article 102. Furthermore, in other embodiments, other types of wearable articles 102 are used, such as wristband, wristwatches or others. In some such embodiments, replaceable and/or interchangeable electronic devices 300 can also be used.

In some embodiments, the wearable article 102 includes an electronic device 300 embedded on, embedded in, and/or formed integrally with band 400. As discussed in further detail below, many different embodiments of the electronic device 300 are envisioned, such as the embodiment discussed in detail with reference to FIG. 3 and the processes implemented using the electronic device 300 coupled with a wearable article 102 described with reference to the various figures below. For example, processes discussed with reference to FIGS. 10-12 involve using a wearable article 102 for payment during a transaction at a point of sale terminal 106. As another example, processes discussed with reference to FIGS. 13-15 involve using a wearable article 102 for communication of financial information to the customer.

Referring again to FIG. 4A, in one embodiment, the band 400 defines a pocket 401 for receiving the electronic device 300, In some such embodiments, the electronic device 300 is inserted into the pocket 401 defined by the band 400 and the pocket 401 is thereafter closed such that the electronic device 300 is permanently retained within the pocket 401. In other such embodiments, the pocket 401 receives the electronic device 300 and is thereafter closed by a temporary closing method such as by using Velcro®, using a button and hole configuration, using a zipper, using a releasable adhesive, or some other temporary closing method. In some embodiments, the pocket 401 is waterproof such that the electronic device 300 is protected in the event the wearable article 102 comes into contact with water. In some embodiments, the band 400 is made in whole or in part from comfortable, flexible neoprene or the like. In some embodiments, the pocket 401 is made from the same material as the band 200, and in other embodiments, the pocket 401 is made from different material than the band 400. In some embodiments, the entire wearable article 102 is made from waterproof materials, and in other embodiments, some or all of the materials used are water resistant. In some embodiments, the electronic device 300 is configured such that it is either water resistant or waterproof. In one embodiment, for example, the electronic device 300 includes a protective shell surrounding the components of the electronic device 300 such that water cannot penetrate the protective shell thereby damaging the components. In some such embodiments, the protective shell is breathable so that the components can "breathe" through the protective shell but water is not permitted access to the inside of the protective shell. In some embodiments, the electronic device 300 is either waterproof or water resistant and is further received by a waterproof or water resistant pocket 401 on the wearable article 102. In some embodiments, the pocket 401 is defined on the outer surface of the band 400, and in other embodiments, the pocket 401 is defined on the inner surface of the band 400, and when the wearable article 102 is worn, the pocket 401 rests against the customer's skin.

In some embodiments, as shown in FIG. 4B, the band 400 is made of nylon webbing. In this embodiment, the band 400 includes a closure system 404 having a ring 406, a tab 408 for extending through the ring 406, and an attachment system 410. In one embodiment, the attachment system 410 is or includes Velcro® such that a first portion of the attachment system 410 is disposed along the outer surface of the band 400 in a middle portion, and a second portion, corresponding to and configured for detachably mating with the first portion, of the attachment system 410 is disposed along the outer surface of the band 400 proximate or at its tab 408. In such a configuration, once the tab 408 has been threaded through the ring 406 and looped around, the two mating portions of the attachment system 410 can mate thereby securing the wearable article 102 on the customer's wrist or ankle.

In various other embodiments, the attachment system 410 includes a male portion disposed at a first distal end of the band 400 and a female portion disposed at a second distal end of the band 400. The male portion and female portion are configured for detachably mating. For example, in one embodiment, the male portion is a plastic piece having three prongs, one stable middle prong configured for guiding the male portion into the female portion and two prongs movable toward the middle prong configured for fitting inside the female portion and coupling therewith such that the male and female portions remain mated until the movable prongs of the male portion are depressed by a customer for detaching. In other embodiments, for example, magnets are used for detachably mating the distal ends of the band 400 with one another. In one embodiment, for example, one magnet is disposed at a distal end of the band 400 and is configured to detachably mate with a magnetic piece disposed at the opposite distal end of the band 400. In yet another embodiment, for example, a clasp and hook attachment system 410 is used, and in another embodiment, two clasps are detachably mated with one another.

In various embodiments of the wearable device 102, the wearable device 102 is configured for wearing on various body parts other than the wrist or ankle, and in other embodiments, the wearable article 102 is configured for wearing on the wrist or ankle in alternate configurations. For example, in one embodiment, the wearable device 102 is worn as an earring. In another embodiment, the wearable device 102 is worn as some other type of piercing, and in yet other embodiments, the wearable device 102 is attached to the customer's clothing such as by clip, snap, Velcro®, pin, or some other attachment mechanism. In some embodiments, the wearable device is a sticker that attaches either to the customer's skin or to the customer's clothing. In some embodiments, the wearable device is disposable and includes a pocket or other electronic device receiver, and the electronic device is reusable such that when the customer discards the wearable device 102, she can retain the electronic device and attach it to another wearable device 102. In some embodiments, the wearable article 102 is or includes a charm wearable on a chain around the neck, ankle or wrist or is or includes a necklace. In other embodiments, the wearable device 102 is or includes one or more rings, a wristwatch or incorporated into a wristwatch, eyeglass rims, eyeglasses, such as embedded in and/or on eyeglass lenses, contact lenses, shoes, purse, wallet, a cap, a hat, a visor, a shoelace, a button, a belt, a belt buckle, an implant, or some other clothing accessory or personal accessory worn or carried on a customer's person.

FIGS. 6-15 illustrate examples of various operations that may be performed by, utilized with, or implemented within wearable article 102 and its embedded or attached electronic device 300 in accordance with various embodiments of the invention.

FIGS. 6-7 illustrate examples of operations for changing the state or contents of a user output device 340 on a wearable article 102 using power received from an external source, such as from a field 502, such as, but not limited to an electromagnetic (EM) field or radio frequency (RF) field, in accordance with some embodiments of the present invention. FIG. 6 illustrates an example of operations wherein the state or contents of the user output device 340 are changed while the wearable article 102 is within the field 502, and FIG. 7 illustrates an example of operations for changing the state or contents of a user output device 340 after the wearable device 102 is outside of the field 502.

Referring to FIG. 6, a process for displaying data on the user output device 340 of a wearable article 102 is illustrated. In some embodiments of the process 600, the processing device 318 instructs the user output device 340 to output data as illustrated by block 602. In other embodiments of the process 600, the display is already displaying existing data. In block 604, the communication device of the electronic device receives, from the communication device of the point of sale terminal, the electromagnetic field thereby powering the voltage regulator and energy storage. In other words, the communication device 312 receives energy such as electro-magnetic energy, and the voltage regulator 322 and energy storage elements 320 of the electronic device 202 are activated. In block 606, the processing device turns on using the power received from the external field, for instance, as regulated by the voltage regulator 322. In some embodiments, the processing device does not turn off, or in others, the processing device turns off after a predetermined period of time without activity. In block 608, the processing device creates, obtains and/or receives new data configured for presentation. The data to be presented can include any type of data that is desired to be presented, based upon the particular implementation, including readable indicia 309. In some embodiments, the data to be presented is received by the communication device and includes data indicating the financial health of one or more of the customer's accounts. In block 610, power is selectively applied to the user output device in order to change the state or contents of the user output device. After providing a particular power level to the display, thereby write-enabling the user output device as represented by block 610, the processing device instructs the user output device to present the data or some presentation derived from the data, as represented by block 612. The processing device, in some embodiments, provides such instructions. In block 614, the user output device persistently presents the new data or some representation of the data. In block 616, once the wearable article is removed from the field, power is removed from the user output device, thereby disabling any further state changes to the contents of the user output device until a time in the future when new data is to be written to the user output device. The processing device, in some embodiments, powers down as represented by block 618.

In various applications and embodiments, the user output device includes one or more of the display device 341, the auditory device 342, the vibratory device 343 and/or a user input device 345. In various embodiments the methods discussed herein, such as presenting data, are performed in whole or in part by one or more of these devices, which are or are included in various embodiments of the user output device 340. For example, readable indicia 309 may be presented via the display device 341 to a POS terminal, wherein the readable indicia 309 are oriented to be captured or received by the POS terminal. Data may be presented or transmitted based on the capturing or receipt of the readable indicia 309.

In some alternate embodiments, as discussed in greater detail herein, the electronic device does not receive power from the field, but only communications, and in some embodiments, the electronic device receives both power and communications from one or more external fields and/or wireless networks. Further, the electronic device may not receive either power or communications and may only present the readable indicia for capturing via a second apparatus. In some embodiments, for example, the communication device of the electronic device receives data over a wireless network sent from a financial institution, such as by a financial institution server or backend system. The data, in some embodiments, includes financial information indicating the financial state and/or activity of one or more of the customer's accounts. When the communication device receives the data, the processing device instructs the user output device to present a representation of some or all of the financial information. In some embodiments discussed herein, the communication device of the electronic device receives data from a mobile device via short range communication protocol.

Referring now to FIG. 7, the new data may be written to the user output device after the wearable article has been removed from the range of the field, in one example. Similar to steps discussed with reference to FIG. 6, the initial steps of method 700 include block 702 representing the processing device instructing the user output device to present existing data, which is an optional step in the method 700. In some embodiments, no existing data is presented. Next, block 704 represents the wearable article entering the field and the communication device receiving a signal from the field. The voltage regulator and energy storage element are powered by the field in some embodiments. Then the processing device turns on as represented by block 706. After the wearable article has been removed from the field, at block 708 the processing device creates, obtains, and/or receives new data for the user output device. At block 710, power from the energy storage element of the electronic device is used and/or applied to write-enable the user output device. At block 712, the processing device, operating under power from the energy storage element in this example, writes new data to the user output device. At block 714, as instructed by the processing device, the user output device persistently presents the new data or some representation of the new data as instructed by the processing device. In one embodiment, for example, the new data represents the financial state and/or financial activity of one or more of the customer's accounts maintained by a financial institution, and the processing device instructs the user output device to present information related to the financial state and/or the financial activity of the customer's one or more accounts.

In some embodiments, process step 708 occurs after the wearable article is removed from the field. In other embodiments, process step 708 occurs before the wearable article has been removed from the field, and process step 710 occurs after the wearable article has been removed from the field. In other words, the processing device, in various embodiments, creates, obtains or receives the new data for presentation before, during or after the wearable article is removed from the field.

FIGS. 8 and 9 illustrate embodiments of processes for controlling a memory device of an electronic device embedded on or in a wearable article. Various embodiments use power from an external source, such as from an electro-magnetic field. Various other embodiments use power stored in an energy storage element, such as a battery. In the embodiment of FIG. 8, for purposes of this example, it is assumed that the memory device contains existing data (as represented by block 802) and that process steps 804-816 can be utilized to change the values stored or encoded in the memory device of the electronic device of the wearable article. Process steps 804-816 or variations thereof may be utilized to initially write one or more portions of the data contained in the memory device if desired.

When the wearable article is placed in the field, as represented by block 804, the wearable device derives power from the field. In one embodiment, for example, the voltage regulator 322 and/or energy storage elements 320 of the electronic device 202 are powered from the field 402. In block 806, the processing device turns on by utilizing the power provided by the field. In one embodiment, for example, the communication device 312 receives the field, and derives a signal based at least in part on the received field. In alternate embodiments, the communication device 312 receives the field, and the processing device is powered by a signal generated by the energy storage element 320. The signal, in some embodiments, is regulated by the voltage regulator 322 and then provided to the processing device 318. At block 808, the processing device 318 creates, obtains or receives new data to be written to the memory device.

At block 810, power is applied to the memory device. In some embodiments, for example, power is applied to the memory device in order to enable writing new data to the memory device. In some embodiments, the power is applied in response to control by the processing device, and in other embodiments, power is applied in response to the wearable article entering the field automatically, that is, without requiring instruction from the processing device. At block 812, the processing device writes new data to the memory device. In such embodiments, the processing device records the new data on one or more portions of the memory device, thereby changing the state of the memory device. At block 814, power is removed from the memory device. In some embodiments, when the power is removed, the write operation is disabled. Once the wearable article is removed from the field, as represented by block 816, the processing device powers down.

In FIG. 9, another process for controlling the memory device of the electronic device is illustrated. New data is written to the memory device after the wearable article is out of the field. Block 902 represents the memory device containing existing data. In some embodiments, the memory device does not contain existing data. Block 904 represents the communication device receiving the field and powering the voltage regulator and energy storage element. As discussed above, in some embodiments, the energy storage element powers the electronic device, and in other embodiments, power is obtained from the field. Block 906 represents the processing device turning on.

At block 908, after the wearable article is removed from the field, the processing device creates, obtains, or receives new data to write to the memory device. In some embodiments, however, process step 908 occurs before the wearable article is removed from the field, that is, while the wearable article is within the field. At block 910, power from the energy storage element is applied to the memory device in order to write the new data to the memory device. At block 912, the processing device writes the new data to the memory device. In some embodiments, similar to those discussed above, the new data is recorded on one or more portions of the memory device of the wearable article.

In various embodiments of the wearable article 102, the electronic device 202 uses a battery for powering the other components of the electronic device, which, in some embodiments includes various combinations of the processing device 318, the user output device 340, the memory device 316 and/or others such as those illustrated in FIG. 3. The energy storage element 320, referring to FIG. 3, in various embodiments, is a very small battery similar or identical to a watch battery, and in some embodiments, the battery is rechargeable. In some embodiments, the energy storage element 320 is or includes a battery, and the process 900, wherein the processing device draws and/or the memory device draw power from the energy storage element 320, the communication device receives the field and charges the rechargeable battery while the wearable device is within the field. Accordingly, once the wearable device has been removed from the field, the energy storage element 320 retains energy for powering other functions of the wearable device. For example, in one embodiment, the user output device of the wearable device can present data while the wearable device is outside the field. In such embodiments, the processing device, the user output device, and, in some embodiments, other components of the electronic device, are powered from power derived from the energy storage element.

Referring now to FIG. 10, a method 1000 for a customer carrying out a transaction at a point of sale terminal using a wearable article 102 in accordance with the present invention is illustrated. First, as represented by block 1002, the customer initiates a transaction at a vendor's point of sale terminal. Next, as represented by block 1004, the point of sale terminal communication device 112 (FIG. 2A) indicates to the customer details of the transaction. For example, in one embodiment, the communication device communicates information regarding the transaction, such as, but not limited to, information related to the amount of the purchase. Then, as represented by block 1006, the customer presents the wearable article 102 at the point of sale terminal 106. That is, in one embodiment, the customer places the wearable article 102 within a field generated by the communication device of the point of sale terminal 106.

Next, as represented by block 1008, the wearable article communicates account information to the point of sale terminal so that the account can be debited. In this step, the processing device 318 reads the memory device 316 to access financial account information 350 regarding one or more of the customer's accounts (see FIG. 3). In some embodiments, the memory device 316 has identification information regarding the one or more accounts saved, and the processing device 318 accesses the identification information. Then the processing device 318 instructs the communication device 312 to communicate the information regarding the one or more customer accounts to the communication device 112 of the point of sale terminal 106. Alternatively, the wearable article communicates account information to the POS terminal via readable indicia.

Finally, as represented by block 1010, the point of sale terminal 106 communicates transaction information to the wearable article 102. In this step, the point of sale terminal has already received account information, processes the transaction by, in some embodiments, communicating with the payment network 116 to determine approval for the transaction, and then communicates confirmation of completion of the transaction to the wearable article 102. In some embodiments, the processing device of the wearable article 102 then instructs the user output device to present an indication of transaction completion to the customer. Such an indication, in one embodiment, for example, is a textual message indicating transaction completion, and in another embodiment, for example, is merely a visual indicator such as a colored LED indication.

Referring now to FIG. 11, a method 1100 for providing payment information to a point of sale terminal 106 is illustrated. In the first step, represented by block 1102, the energy storage element of the electronic device 300 carried by the wearable article 102 powers the electronic device 300. In some embodiments, the energy storage element is supplied power by a field generated by the communication device of the point of sale terminal 106 and received by the communication device of the electronic device 300. In other embodiments, the energy storage element has previously stored power. In one embodiment, for example, the energy storage element is a battery having previously stored power.

In the next step, represented by block 1104, the processing device of the electronic device receives a signal from the point of sale terminal requesting payment information. In this step, the communication device of the point of sale terminal communicates a signal containing a message to the electronic device after the customer has initiated a transaction. In some embodiments, the message includes information related to the amount of the transaction.

In the next step, represented by block 1106, the processing device reads at least a portion of the account information stored at the memory device of the electronic device. In some embodiments, the account information includes account identification information such as account number and/or routing number. In other embodiments, other financial account information 350 and/or device-identifying information 351 or other information is included.

In the next step, represented by block 1108, the processing device instructs the communication device of the electronic device to communicate at least a portion of the information read from the memory device to the point of sale terminal in response to the request by the point of sale terminal. In this step, the communication device communicates some or all of the account information identifying or pointing to identification information regarding the account the customer wishes to use to make the purchase. Finally, as represented by block 1110, the communication device receives confirmation of completion of the transaction from the point of sale terminal. In some embodiments, the processing device then instructs the display to display an indication of completion of the transaction based at least in part on the confirmation received from the point of sale terminal to the customer. In some such embodiments, the indication of completion includes a textual message and in other embodiments the indication includes a color LED indication.

In various other embodiments, the point of sale terminal 106 communicates with the mobile terminal 103 in order to carry out the transaction. In such embodiments, the mobile terminal 103 communicates with the wearable article as necessary to output information or receive input from the customer, but in some such embodiments, as illustrated in FIG. 2B, the memory device 220 of the mobile terminal 103 includes various information and/or instructions used during the transaction methods and/or other methods discussed herein.

Referring now to FIG. 12, a method 1200 for receiving payment information from an electronic device carried by a wearable article worn by a customer is illustrated. In the first step, as represented by block 1202, the communication device of a point of sale terminal generates a field configured for providing power to an electronic device of a wearable article. As discussed elsewhere, the field, in various embodiments, is an electro-magnetic (EM) field, a radio frequency field, or some other field. Next, as represented by block 1204, the processing device of the point of sale terminal communicates a request for payment information to the electronic device. The communication device of the electronic device receives the request and responds with payment information based at least in part on account information read from the electronic device's memory device as discussed above. The electronic device of the wearable device then communicates at least a part of the account information as payment information to the point of sale terminal. The next step in the method, as represented by block 1206, is the processing device instructing the communication device of the point of sale terminal to receive the payment information corresponding with at least a portion of the account information stored by the electronic device. The portion of the account information corresponds with one or more accounts owned by the customer. The next step of the method is represented by block 1208. In this step, the processing device determines whether the account corresponding to the payment information received has sufficient funds for the transaction. In various embodiments, the processing device accesses account information stored in the memory device 114 at the point of sale terminal or accesses the financial institution's backend systems 118 through the payment network 116 in order to access stored account information (see FIG. 1). Once the processing device has determined sufficient funds in the account identified by the payment information, the processing device instructs the communication device to communicate a confirmation communication to the electronic device as represented by block 1210. The confirmation communication includes information indicating the success of the transaction, and in some instances, the wearable article communicates confirmation of the transaction to the customer as discussed above.

FIGS. 13-15 involve implementation of a financial indicator, such as financial indicator 223 or 352 or readable indicia 309 in association with a wearable article in accordance with embodiments of the present invention.

Referring now to FIG. 13, a method 1300 for establishing a financial indicator profile, such as 126 and/or 224 and/or a financial indicator profile stored in memory device 316 (not shown) is illustrated. The first step, as represented by block 1302, is the financial institution server communicating a financial indicator option to the customer. In one embodiment, for example, the financial institution server is an online banking server, and once the customer has logged onto online banking, the server communicates a message to the customer indicating an option for using the financial indicator. In another embodiment, the financial institution server is an automated teller machine that communicates with the customer and performs the steps of method 1300. In yet other embodiments, the financial institution server is a server connected with a workstation inside the financial institution for the customer to use while visiting the financial institution. In various other embodiments, the server is or includes various other components configured to communicate with the customer and establish the financial indicator profile. The next step, represented by block 1304, is the financial institution server receiving customer preference to set-up the financial indicator functionality. The financial indicator profile may be associated with readable indicia and therefore information received or captured of the readable indicia 309 may be used to identify the customer.

Next, as represented by block 1306, the financial institution server requests financial indication parameters from the customer. Such parameters include, in various embodiments, information regarding one or more account(s) the customer wishes to associate with the financial indicator profile. In some embodiments, the server provides the customer with a list of eligible accounts or eligible readable indicia. In one such embodiment, the server provides a list of all deposit accounts associated with the customer's online banking profile for the customer's consideration. In addition to the account(s) to be associated with the financial indicator profile, the customer is also asked to establish rules defining the various financial indications. For example, in one embodiment, the server asks the customer to establish multiple thresholds representing amounts of funds within an account. For example, the customer may establish a "very serious" threshold at $100 for his checking account. As another example, the customer may establish a "moderately serious" threshold at $500 for her checking account. As yet another example, the customer may establish a "mildly serious" threshold at $1000 for her checking account. Of course, the customer can establish many different threshold levels for the one or more account(s) and can also establish additional rules for defining financial indications. For example, in one embodiment, the customer can establish a rule taking into account day of the month, day of the week, and/or time of day. For example, in one specific embodiment, a customer may establish a rule defining a "very serious" threshold as his savings account dropping under $1000 after the $20^{th}$ of the month. Such a rule, for example, may be useful in order to ensure the customer is aware his funds are below a threshold necessary for him to pay his mortgage payment after the first of the month. In another example, in another embodiment, a customer may establish a rule defining a "mildly" serious" threshold as her savings account rising above $10,000. Such a rule, for example, may be useful in order to alert the customer that her account has sufficient funds for transferring into a higher yield account, or in another embodiment, the rule may be helpful if the customer is saving for a particular purchase. Thus, rules may be established based on a variety of considerations including multiple considerations, such as, for example, taking into account time of day in addition to levels of funds in one or more accounts. Furthermore, in other embodiments, multiple accounts can be tied into one rule. For example, a customer may desire a financial indication when she has at least a certain amount of funds in one account along with having less than another amount of funds in another account.

At block 1308, the financial institution server receives the financial indication parameters from the customer and defines a financial indicator profile for the customer based at least in part on the parameters received. In block 1308A, the financial institution server associates one or more display outputs with one or more specific financial health states. In this step, which is included in some embodiments and not in others, the server assigns a specific type of display output, such as a red light, to a specific financial health state, such as a "very serious" state. In other embodiments, the server assigns multiple display outputs and/or other indicator outputs such as audible or vibratory outputs with the various financial states, or updates readable indicia with the defined financial indicator profile. In some embodiments, the server does not assign display outputs or other indicator outputs to the various financial states, but merely identifies and defines the financial states. In such embodiments, the financial states will be communicated to the wearable device in a later step and the wearable device processes the financial states and determines the appropriate indicator output based on the received and processed financial state. In some such embodiments, the customer and/or the server assigns one or more of the various indicator outputs during set-up of the financial indicator profile and appropriate program code is downloaded to the memory device of the wearable article in order for the wearable article to be configured for receiving the financial state, processing the financial state, and displaying appropriate corresponding indicator outputs based on the financial state communicated from the server.

In block 1308B, the financial institution server defines communication settings including associating one or more wearable article(s) with the financial indicator profile. At block 1308C, the financial institution server stores the financial indicator profile at the server, and in some embodiments stores some or all of the financial indicator profile remotely at the wearable article(s). Finally, at block 1310, the financial institution server communicates the initial financial state to the wearable article(s) based on the stored financial indicator profile and application of the rules saved in the profile to the present circumstances of the customer's account(s) and any other necessary input information. In some embodiments, the wearable article indicates the initial financial state, and in other embodiments, it does not. In some embodiments, the wearable article only indicates the financial state if the state is determined, by the processing device of the server or the electronic device or both, to be abnormal, thereby necessitating indication to the customer.

As discussed above, once the wearable article(s) have been associated with the financial health profile, in some embodiments, program code and/or variables are downloaded to the wearable article(s) to configure the wearable articles to provide appropriate indicator output given each specifically defined financial state and/or financial activity, such as readable indicia. In some embodiments, no code is downloaded to the wearable article(s), but rather the wearable article(s) are pre-programmed with embedded code during or proximate manufacture such that the wearable article(s) are pre-configured for processing information regarding various financial indicator states received from a server or point of sale terminal. In some embodiments, the wearable article(s) are both pre-programmed and configured to some extent and the server also downloads some program code for configuring the wearable article(s) regarding proper indication for the various financial states established during set-up of the customer's financial indicator profile. In some embodiments, the financial states are standardized and the wearable article(s) are pre-programmed for receiving information regarding the financial state and indicating to the customer based on the pre-programming in light of the information. In some other embodiments, the information communicated from the server or point of sale terminal regarding financial state includes information instructing the wearable article(s) regarding proper indication for the financial state. For example, in one embodiment, the communication from the server including financial state, such as the initial financial state, includes instructions for the processing device of the wearable article configured to instruct the user output device of the wearable article for appropriate presentation to the customer, such as, for example, a flashing red light indicating some financial state and/or financial activity.

Referring now to FIG. 14, a method 1400 for communicating financial information to a wearable article carried by a customer is illustrated. The first step, as represented by block 1402, the financial institution server applies the saved financial indicator profile to the associated account(s) of the customer. In this step, the server gathers information from the account(s) such as balance information as well as any other information necessary based on the established rules. For example, if a rule included in the profile calls for an indication if the account falls below a threshold balance amount after a particular day of the month, then the server gathers the day of the month if necessary before, during or after accessing the level of the account with regard to the established threshold. Next, at block 1404, in some embodiments, the server detects a triggering event. In the example discussed above, the triggering event would be the account balance falling below the threshold amount after the predetermined day of the month. In some embodiments, the triggering event is preemptive. That is, the underlying event has not yet occurred, for example, the account balance has not yet fallen below the threshold amount, but is close to doing so. In some embodiments, during a transaction, when an account associated with the financial indicator profile is indicated as a purchase account, the server analyzes the financial indicator profile and applies the parameters established by the customer in order to determine whether the transaction will trigger a threshold breach. In some embodiments, for example, the customer may have indicated the desire to receive an indication should a particular pending transaction be a triggering event. In such a case, the customer can establish as a parameter the method of indication and the potential remedies, such as for example, an opportunity to proceed with the transaction, or alternatively, an opportunity to terminate the transaction. Such remedies, in some embodiments, can be communicated to the customer by the server through the wearable article, regardless of whether the wearable article is being used as a payment device as discussed above.

Next, as represented by block 1406, the financial institution server applies the financial parameters established by the customer thereby determining a financial state and/or activity including financial information based at least in part on the detected one or more triggering events. As represented by block 1408, in the next step, the financial institution server communicates the current state to the wearable article(s) when the financial state is unchanged. For example, in one embodiment, if a single threshold for a single account has been set at a particular amount such that an indication with be made when the account balance falls below the threshold, but the account balance has not fallen below that threshold (which would have been a triggering event), then the financial state is considered unchanged. Hence, if the wearable article is already persistently displaying the current financial state, then the indication will remain unchanged. Or, if the wearable article(s) was not indicating a financial state at all, the state can be communicated to the wearable article(s) for indication.

Next, as represented by block 1410, the financial institution server communicates a state change to the wearable article(s) when the financial state is changed. Referring back to the above example, in one embodiment, when the account balance falls below the threshold, it is considered a triggering event and the financial state is considered changed based on the pre-established parameters and the rules derived from the customer inputted parameters. Thus, in this step, the server communicates the state change to the wearable article(s) for indication to the customer.

Referring now to FIG. 15, a method 1500 for communicating financial information sent from a financial institution server to the customer using a wearable article is illustrated. The first step, as represented by block 1502, is the electronic device of the wearable article(s) receiving the initial state from the financial institution server. Next, at block 1504, the electronic device displays financial indication to the customer based at least in part on the initial state received. Then, at block 1506, the electronic device receives a state change from the financial institution server and displays the financial indication to the customer based at least in part on the state change received from the server as represented by block 1508. The state communicated by the server to the electronic device in various embodiments includes information and/or instructions for which type of indication to implement. For example, in the case where the display includes three LEDs capable of emitting three different colored lights, in some embodiments, the state communication includes instructions for lighting the proper LED(s) to indicate the current state. In other embodiments, the state communication does not include instructions regarding specific indication implementation, but rather, includes a standardized communication indicating the state as one or more taken from a set of possible states. In such embodiments, the electronic device is pre-programmed to accommodate a variety of potential states and their corresponding state communications such that the electronic device processes the communication based on the stored pre-programming in order to properly indicate the state to the customer. In some embodiments, the pre-programming is part of the set-up process such that the customer is able to specify the particular type of indication given a particular scenario regarding the customer's account(s).

Referring now to FIG. 16, FIG. 16 illustrates an exemplary process flow 1600 describing a method for facilitating a financial transaction utilizing a wearable device as a payment vehicle, wherein the wearable device is associated with one or more financial accounts and is configured to facilitate a financial transaction using at least one of the one or more financial accounts. At block 1602, the process includes retrieving, via a sensor associated with a second device, at least one readable indicia associated with the wearable device, wherein the readable indicia comprises payment information associated with the financial transaction. At block 1604, the process includes receiving, via a computing device, payment information from the readable indicia, wherein the payment information includes at least a purchase amount. At block 1606, the process includes processing, via a computing device, payment information, wherein processing the payment information includes determining that the one or more financial accounts associated with the wearable device includes an amount of funds at least equal to the purchase amount. At block 1608, the process includes executing, via a computing device, the transaction in response to determining that the amount of funds included in the one or more financial accounts associated with the wearable device is at least equal to the purchase amount.

In various embodiments of the processes discussed, including but not limited to processes 1300, 1400, 1500, and 1600, encryption and decryption techniques can be used to secure information communicated from the server and/or point of sale terminal to the wearable device and/or from the wearable device to the server and/or point of sale terminal.

In various embodiments, market conditions are taken into account when establishing the financial indicator profile. For example, the parameters input by the customer and the rules derived from the parameters can take into account a drop or rise of a market indicator such as an index of the stock market. The customer can request an indication on the wearable article regarding one or more markets passing certain thresholds or other indication mechanisms. Additionally, the rules, in some embodiments, can be established such that the customer's personal account(s) associated with the wearable article are examined in conjunction with market activity or some other external source of information before financial states are determined and communicated to the wearable article. This allows the customer to, if desired, take steps to buy or sell stocks or other products upon receiving certain indications from the wearable article.

In various embodiments of the financial health indicator functionality, the wearable article is configured for providing an indication based on peer behaviors. That is, in some embodiments, the financial indicator profile is established such that activity other than the customer's is indicated to the customer through the financial indicator. For example, in one embodiment, the customer is monitoring an account owned by one of the customer's children such that when the balance falls below a threshold predetermined by the customer, and input into the financial indicator profile, the server determines communicates the financial state to the wearable article thereby indicating to the customer the balance having fallen below the threshold. In another example, in one embodiment, a group with a common goal establishes a financial indicator profile, and the entire group is alerted to progress towards the common goal based on predetermined thresholds saved in the profile. The server communicates financial state messages to wearable articles carried by each of the members of the group. In one specific example, the members of the group are raising funds for a charity. As the funds are deposited into the earmarked account, which is associated with the financial indicator profile and thereby the wearable articles also associated with the profile, the server communicates financial states including information regarding the financial state and/or activity of the account to the wearable articles for indication to the members of the group. For example, as the funds pass predetermined thresholds, each member of the group is alerted to the level of funds by one or more indications by each of their wearable articles. In one example, the wearable articles are decorative pins that change colors as certain thresholds are passed in response to communications from the financial institution server acting in accordance with the established financial indicator profile. In some embodiments, indicators are made based on the customer's financial information in relation to others in the customer's peer group, such as those of similar income levels, age, geographic area, and the like.

In various embodiments, the wearable article 102 communicates with the point of sale terminal, one or more financial institutions or both. For example, in one embodiment, the wearable article receives financial information in the form of financial state information from either the point of sale terminal, if it is within proximity of a field or network generated by the point of sale terminal or the financial institution server if it is within proximity of a wireless network or other network in communication with the financial institution server.

Furthermore, in various embodiments wherein the electronic device 202 retains energy in the energy storage element 320 while outside of the field 502, the wearable article 102 can be used for transactions such as payment transactions at point of sale terminals 106 without requiring a field 502 for power. For example, in one embodiment, a point of sale terminal communication device 112 communicates in one or more wireless communication protocols such as, but not limited to, the Near Field Communication (NFC) protocol, Bluetooth, electro-magnetic communication protocols, radio frequency (RF) communication protocols and the like. In such embodiments, the wearable article 102 communicates with the point of sale terminal but does not receive power from a field generated by the terminal. In other embodiments, both a field 502 and an additional communication network are generated by the terminal such that the wearable device 102 receives power via the field 502 and communicates via the communication network with the terminal. In some embodiments, the field 502, the communication network or both are generated by an entity other than the point of sale terminal.

It should be noted that in various embodiments of the invention, the field does not power the voltage regulator, energy storage element, processing device, display, memory device communication device, or other components of the electronic device of the wearable article, but rather, the components are powered by previously stored power held by the energy storage element. In some embodiments, for example, the energy storage element is one or more batteries configured for powering the electronic device. In other alternate embodiments, the field powers some but not all the components of the electronic device of the wearable article. For example, in some embodiments, the field is received by the communication device of the electronic device and is converted into a signal. The signal is used to power the voltage regulator and the energy storage element for present and/or future operation of the various components of the electronic device such as but not limited to, for example, the processing device.

In various embodiments, the financial information, that is, the financial state and/or financial activity, is real-time information or near-real-time information about the customer's account(s). In some embodiments, the information is presented to the customer constantly, periodically, or consistently by being pushed to the wearable article 102 by either the financial institution server 120 and/or the mobile terminal 103. In other embodiments, such information is pulled by the wearable article 102 based upon a customer request or other input. In some embodiments, the customer interaction may require authentication and/or encryption of data being communicated, such as account information being communicated from the wearable article to the point of sale terminal. In some embodiments, one or more encryption keys are stored in the wearable article and/or in the mobile terminal. In some embodiments, the indications to the customer and the information being indicating may be customized so that security and/or authentication may not be required. In various other embodiments, communications among the wearable article, the mobile terminal and/or the financial institution server may or may not include confidential information and may or may not include generic indicators for indicating to the wearable article to present a particular financial state and/or activity.

In various embodiments, kinetics, that is, human generated energy technology is used to power the wearable article 102.

In various embodiments, the established thresholds of the financial indicator profile are related to meeting forecasted payment obligations or representing progress towards one or more goals, such as, for example, savings for a child's college education, a house, car or other large item down payment, or the like.

In various embodiments, the wearable device is configured to present to the customer different presentations throughout a day or other time period. For example, presenting information regarding expense management in the morning, information regarding investment portfolios in the evening and the like.

In various embodiments, a game scenario is used in conjunction with the wearable article such that, for example, a group of friends can all establish financial indicator profiles setting individual goals and engaging in a competition against one another. The indicator, in some embodiments, represents how each customer is doing with respect to the others of the group. One example of this embodiment, is a game used in a charity fund raising event, and another example is with respect to business teams competing against one another.

Embodiments of the present invention provide a wearable article configured for providing payment information to a point of sale terminal during a transaction. The wearable article, in some embodiments, includes a band configured for wrapping around a body part of the customer and for carrying an electronic device. In some embodiments, the band has an attachment system for removably securing the band to the body part of the customer. The electronic device includes an energy storage element, a memory device, a communication device and a processing device. The processing device is configured for receiving a communication from the point of sale terminal requesting payment information for completion of the transaction. The processing device reads account information from the memory device and communicates payment information to the point of sale terminal. In some embodiments, the wearable article receives power from a field generated by the point of sale terminal.

Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As used herein, unless specifically limited by the context, the term "transaction" may refer to a purchase of goods and/or services (collectively referred to herein as "products"), a withdrawal of funds, an electronic transfer of funds, a payment transaction, a credit transaction, a PIN change transaction or other interaction between a cardholder and the bank maintained a bank account owned by the cardholder. As used herein, a "bank card" refers to a credit card, debit card, ATM card, check card, or the like, or other payment device such as, but not limited to, those discussed above that are not cards. An "account" or "bank account" refers to a credit account, debit account, deposit account, demand deposit account (DDA), checking account, budgeting account or the like. Although the phrases "bank card" and "bank account" include the term "bank," the card or payment device need not be issued by a bank, and the account need not be maintained by a bank and may instead be issued by and/or maintained by other financial institutions.

As used herein, a "processing device" generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities.

As used herein, a "communication device" generally includes a modem, server, transceiver, and/or other device for communicating with other devices directly or via a network, and/or a user interface for communicating with one or more users. As used herein, a "user interface" generally includes a display, mouse, keyboard, button, touchpad, touch screen, microphone, speaker, LED, light, joystick, switch, buzzer, bell, and/or other user input/output device for communicating with one or more users.

As used herein, a "memory device" or "memory" generally refers to a device or combination of devices including one or more forms of non-transitory computer-readable media for storing instructions, computer-executable code, and/or data thereon. Computer-readable media is defined in greater detail herein below. It will be appreciated that, as with the processing device, each communication interface and memory device may be made up of a single device or many separate devices that conceptually may be thought of as a single device.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor/processing device may be "configured to" perform a certain function in a variety of ways, including, for example, by having one or more general-purpose circuits perform the function by executing particular computer-executable program code embodied in computer-readable medium, and/or by having one or more application-specific circuits perform the function.

The present invention is directed to a wearable device that enables a user to transfer funds, credits, debits, or the like directly from a banking account to a second payment device or apparatus. The wearable device includes at least one of a wristband, a bracelet, a watch, a ring, jewelry, glasses, a pen, a hairband, a charm, a magnetic strip, a stylus, or another device capable of being worn or carried by the user (e.g., held, worn, or carried in a pocket). The wearable device includes readable indicia (e.g., a QR code, a bar code, an image readable code, or the like) that can be scanned, read, or received by a second device (e.g., a smart phone, a POS terminal) for payment.

In some embodiments, the wearable device is a low-cost, disposable device, such as a plastic wristband, that has readable indicia printed on or adhered to an outside surface of the wearable device. In other embodiments, the wearable device is a higher-cost non-disposal device, such as a wristwatch or a wearable computing device, and includes a display means configured to display readable indicia. The wearable computing device is configured to communicate via Wi-Fi, Bluetooth, radio waves, or other transmission means to the second device for payment. The wearable computing device may utilize an onboard operating system or may be used to access a cloud-based operating system.

The readable indicia are configured to be associated with at least one account associated with the user, such as a checking account, a savings account, a temporary business account, a rewards account, a school account or the like. In some embodiments, the readable indicia serve as a pointer to the account associated with the user. For example, when scanned by the second device for payment, the readable indicia are configured to transmit information associated with the account associated with the user to the second device. The readable indicia are further configured to be associated with a token that is used to as a pointer to account information associated with a financial account associated with the user.

Information associated with the account may include but is not limited to payment information (e.g., a payment amount, a total amount, an itemized list of purchases, product information, or the like), account information (e.g., an account number, a routing number, an account balance, or the like), contact information (e.g., a name, a mailing address, an email address, a phone number, a zip code, a city, a state, a region, a country, a social security number, a customer number, or other personal information), location information (e.g., GPS coordinates associated with the wearable device or the second device, longitude and latitude, an Internet Protocol (IP) address, or the like).

In some embodiments, as described above, the wearable device is used as a payment device to facilitate the transfer of funds from an account associated with the user or execution another financial transaction such as a withdrawal, a deposit, a balance inquiry, or the like. The wearable device may further be configured to support the transfer of a virtual currency, reward points, or may be used to identify benefits associated with the user (e.g., a VIP status). For example, the user may utilize the wearable device to store points which may be redeemed at entrances of rides at a theme park. A first value of points may be used for general ride entry, while a second value of points may be used for VIP-only ride entry. Scanning the readable indicia of the wearable device with the second device (e.g., the user's smart phone) may inform the user of how many points remain on the wearable device, and whether or not the user qualifies for VIP-only ride entry. Furthermore, the wearable device is configured to revert back or deposit any unused funds associated with or allocated to the wearable device to the account associated with the readable indicia. For example, the user is refunded a monetary equivalent of the remaining balance of points allocated to the readable indicia of the wearable device, and the refunded amount is transferred back into the account associated with the user.

The user is enabled to configure the wearable device, including the association of one or more accounts with the readable indicia via a dashboard, a mobile application, an online portal, a smart phone, the second device, a kiosk or terminal, or the like. In some embodiments, the user may associate multiple accounts with the readable indicia. For example, the user may associate a checking account and a savings account with the readable indicia, wherein upon use as a payment device, the user is enabled to select from which account the payment amount of funds is transferred. In other embodiments, the user may associate one account with multiple readable indicia. For example, a parent may associate multiple readable indicia associated with multiple wearable devices so that each member of the parent's family (e.g., children, spouse, relatives, and friends) has her or his own wearable device, but all wearable devices are associated with the same account.

The user may further configure each wearable device with spending limits based on purchase amounts (e.g., each wearable device is configured to spend no more than $50 over a predetermined period of time), purchase types or categories (e.g., food and drink only, and no games), locations (e.g., each wearable device is operable as a payment device only within certain buildings, GPS locations, addresses, with particular POS terminals, or the like), time limits (e.g., transferring funds is only allowed on weekends after 5 pm, or for a particular vacation week), limits based on a predetermined or expected pattern of travel, budget limits, or other limits. The present invention also includes means for tracking user behavior, transaction information, and limits of funds based on spending, location of transactions (via GPS, address, or the like), or other metrics associated with wearable device usage. The user may receive a report or summary of the tracked information so that the user may make informed decisions in regards to configuring limits for one or more wearable device.

In some embodiments, the readable indicia are temporary. For example, the readable indicia are specifically distributed to the user on waterproof, disposable wristbands for a business trip, a school trip, or vacation. The readable indicia may be configured for single use. The readable indicia may also be configured for multiple usage and may be reloadable or reassignable to various accounts associated with the user. The readable indicia may change based on user configuration. For example, the wearable device may present new readable indicia via a display device each time the readable indicia is reloaded with more funds or associated with a new account, if the wearable device is stolen or lost, or the like. The readable indicia may also be associated with a prepaid account, a temporary account, a one-time use account, or the like. In other embodiments, the readable indicia are permanent or non-changeable.

The user may capture the readable indicia via the second device (e.g., a smart phone camera). The second device, via an application dedicated to configuring the wearable device, may provide the user with information associated with the wearable device, such as an account balance, a spending history, device identification information, or the like. The user may then, via the application, configure the wearable device or multiple wearable devices. For example, the user may allocate or transfer funds to the wearable device from an account, manage the association of an account with the wearable device, associate spending limits with the wearable device, or the like.

The present invention may further include the ability to recognize gestures, clicks, biometric inputs, or selections made by the user via the wearable device. For example, the user may configure limits or allocate funds to the wearable device using a laser-based or holographic virtual keyboard produced by the wearable device. As another example, the user may make a selection via computerized glasses (e.g., the wearable device) simply by blinking. The wearable device is configured to identify where the user's eyes are focused—a button that the user's eyes are hovering on, or the like—and determine that the user indeed wishes to select that button.

The wearable device may further be used as a means of authenticating the user for various transactions, actions, or the like. The wearable device (and readable indicia) also can be used to hold or store information associated with the user, an account associated with the user, a transaction history associated with the user, location information, or the like. The information may be processed by the apparatus or the wearable device to produce a customized or personalized experience for the user. For example, the user may receive alerts, updates, coupons, or notifications based on a purchase history, when an account balance falls below a predetermined level, or for another reason. Alternatively, the personalized experience may inform the user of particular available perks (e.g., VIP access or free parking), discounts, offers, rewards, or the like based on a predetermined relationship between the user and a particular merchant or entity, proximity to a location, or the like.

The present invention may further utilize proximity or location-based technologies to ensure that execution of a transaction via the wearable device is indeed properly authenticated. For example, the present invention may enable the user to configure a predetermined range within which the wearable device is determined to be in close proximity to a smart phone associated with the user that the user uses to configure the wearable device. If the wearable device is determined to be in close proximity to the smart phone, then the wearable device may be authenticated at least partially or fully authenticated. If the wearable device is determined to be outside the predetermined range of close proximity to the smart phone, then the wearable device may not be authenticated or partially authenticated. Additional authentication may be required to execute a transaction via the wearable device if the wearable device is outside a predetermined close proximity distance.

Alternatively, exceeding user-set limits may require additional authentication to complete execution of a transaction. For example, during a business trip, an employee is limited to make purchases only related to food and lodging with the wearable device only at merchants located within a predetermined expected path of travel. When the employee attempts to make a purchase for a movie at a location outside the expected path of travel, execution of the purchase may be denied, or, alternatively, may require additional user authentication. The user may possess a password, a PIN, or the like that enables the user to override the limits and execute the purchase.

Utilizing the wearable device as a payment vehicle provides many benefits. The user may easily distribute funds to the wearable device via a smart phone for a vacation at a theme park or a waterpark that requires the user to store all electronic devices. Therefore, the user may use the wearable device to pay for activities, food, events, transportation, entertainment, or the like using the wearable device while inside the park. The wearable device provides the user with a simple way to continue enjoying the park and its amenities while ensuring that their permanent smart phones, wallets, keys, or the like are safe and free from hazards (namely water) while at the park. The limits associated with the wearable device enable the user to easily manage and maintain a budget for a group of users.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

What is claimed is:

1. A system configured to facilitate a financial transaction using a wearable device as a payment vehicle, the system comprising:
    the wearable device comprising:
        a wearable article, wherein the wearable article comprises one or more features securing the wearable article to a person or an item associated with the person; and
        a portion of said wearable article comprising at least one machine-readable indicia, wherein the at least one machine-readable indicia, when successfully read, provides payment information for facilitating the financial transaction; and
    a mobile communication device comprising:
        a memory;
        at least one processor; and
        a module stored in memory, executable by the at least one processor, and configured to cause the at least one processor to:
            receive from a second device the at least one readable indicia, which was scanned via a sensor associated with the second device, the readable indicia being associated with the wearable device of the user;
            receive a first user input that assigns the at least one readable indicia to a financial payment account;
            receive a second user input that assigns at least one limit associated with a user spending to the at least one readable indicia;
            continuously monitor the user spending, wherein monitoring further comprises comparing the user spending with the at least one limit, wherein comparing further comprises assigning a spending index to indicate whether the user spending is lesser than, equal to, or greater than the at least one limit; and
            display the spending index on a display device associated with the wearable device.

2. The wearable device of claim 1, wherein the wearable article is at least one of a bracelet, a ring, a watch, a wristband, an ankle band, a hairband, a headband, a necklace, jewelry, eye glasses, a monocle, a pen, a hairband, a bracelet charm, a magnetic strip, a stylus, or a tag.

3. The wearable device of claim 1, wherein the at least one machine-readable indicia are static and are printed on the wearable article.

4. The wearable device of claim 1, wherein the at least one machine-readable indicia are dynamic and are presented via a display device associated with the wearable article.

5. The wearable device of claim 1, wherein the at least one machine-readable indicia are configured for one-time use.

6. The wearable device of claim 1, wherein the at least one machine-readable indicia are dynamically associated with at least one financial account.

7. The wearable device of claim 6, wherein the at least one machine-readable indicia are at least one of reloadable, disposable, prepaid, temporal, or permanent.

8. The wearable device of claim 1, wherein an amount of at least one of funds, points, benefits, rewards, or virtual currently is allocated to and associated with the at least one machine-readable indicia from the financial payment account.

9. The wearable device of claim 8, wherein an unused amount of funds allocated to and associated the at least one machine-readable indicia is configured to be deposited into the financial payment account associated with the machine-readable indicia.

10. The wearable device of claim 8, wherein the at least one machine-readable indicia is read by the mobile communication device via at least one of a smart phone camera, a mobile device camera, a laptop camera, a tablet camera, a near field communication (NFC) device, a radio frequency identification (RFID) device, or a laser bar code scanner.

11. The wearable device of claim 1, wherein a user is enabled to configure the assignment of at least the financial payment account and the at least one limit to the at least one readable indicia via an application associated with or accessible by the mobile communication device.

12. The wearable device of claim 1, wherein the portion is waterproof.

13. The wearable device of claim 1, wherein the portion further comprises at least one of a computing device, a processing device, a memory device, a communications device and a display, wherein the portion is configured to communicate with the mobile communication device via at least one of wireless communications, near field communication (NFC), radio frequency identification (RFID), a camera, or a scanner.

14. The wearable device of claim 13, wherein at least one of the wearable device or the mobile communication device is configured to communicate with and transfer payment information regarding a financial transaction to at least one of a point of sale terminal, a computer, a smart phone, a mobile device, a tablet, a laptop computer, or a server associated with a financial institution.

15. The wearable device of claim 1, wherein the one or more limits include at least one of a spending limit, a limit based on spending behavior, a limit based on location of at least one of a merchant, the person, or the wearable device, a limit based on a purchase category, a limit based on a purchase type, a limit based on an item category, a limit based on an item type, a limit based on a purchase amount, a limit based on a purchase frequency, a limit based on a period of time, a number of transactions, or a combination of limits.

16. The wearable device of claim 1, wherein the machine-readable indicia includes at least one of a quick response (QR) code, a bar code, a string of characters, a near-field communication (NFC) device, a radio frequency identification (RFID) device, a number, text, an icon, or an image.

17. The wearable device of claim 16, wherein the machine-readable indicia is capable of at least one of being updated, changed, replaced, or modified by a user.

18. The wearable device of claim 1, wherein payment information includes at least one of an account number, a routing number, a customer number, a customer name, a merchant number, a merchant name, an account balance, a purchase amount, a withdrawal amount, a deposit amount, a tax amount, a time and date of transaction, location information associated with the transaction and merchant, a password, a username, or an authentication credential.

19. A method for facilitating a financial transaction utilizing a wearable device as a payment vehicle, wherein the wearable device is associated with one or more financial accounts and is configured to facilitate a financial transaction using at least one of the one or more financial accounts, the method comprising:
receiving at least one readable indicia scanned via a sensor associated with a second device, the readable indicia being associated with the wearable device of the user, wherein the readable indicia comprises payment information associated with the financial transaction and at least one limit associated with a user spending using the payment information;
receiving, via a computing device, payment information from the readable indicia, wherein the payment information includes at least a purchase amount;
processing, via a computing device, payment information, wherein processing the payment information includes determining that the one or more financial accounts associated with the wearable device includes an amount of funds at least equal to the purchase amount;
executing, via a computing device, the transaction in response to determining that the amount of funds included in the one or more financial accounts associated with the wearable device is at least equal to the purchase amount;
continuously monitoring, via a computing device, the user spending, wherein monitoring further comprises comparing the user spending with the at least one limit, wherein comparing further comprises assigning a spending index to indicate whether the user spending is lesser than, equal to, or greater than the at least one limit; and
transmitting, via a computing device, the spending index for display on a display device associated with the wearable device.

20. A computer-program product for facilitating a financial transaction using a wearable device as a payment vehicle wherein the wearable device is associated with one or more financial accounts and is configured to facilitate a financial transaction using at least one of the one or more financial accounts, the computer program product comprising a non-transitory computer-readable medium comprising code causing a first apparatus to:
receive from a second device, the at least one readable indicia, which was scanned via a sensor associated with the second device, the readable indicia being associated with the wearable device of the user, wherein the readable indicia comprises payment information associated with the financial transaction and at least one limit associated with a user spending using the payment information;
receive, via a computing device, payment information from the readable indicia, wherein the payment information includes at least a purchase amount;
process, via a computing device, payment information, wherein processing the payment information includes determining that the one or more financial accounts associated with the wearable device includes an amount of funds at least equal to the purchase amount;
execute, via a computing device, the transaction in response to determining that the amount of funds included in the one or more financial accounts associated with the wearable device is at least equal to the purchase amount;
continuously monitor the user spending, wherein monitoring further comprises comparing the user spending with the at least one limit, wherein comparing further comprises assigning a spending index to indicate whether the user spending is lesser than, equal to, or greater than the at least one limit; and transmit the spending index for display on a display device associated with the wearable device.

\* \* \* \* \*